US012388729B2

(12) United States Patent
Nguyen et al.

(10) Patent No.: US 12,388,729 B2
(45) Date of Patent: Aug. 12, 2025

(54) METHODS AND APPARATUS FOR DETECTING NETWORK SERVICES

(71) Applicant: SAMSUNG ELECTRONICS CO., LTD., Suwon-si (KR)

(72) Inventors: Khuong Nhat Nguyen, Frisco, TX (US); Abhishek Sehgal, Plano, TX (US); Hao Chen, Plano, TX (US); Guanbo Chen, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/393,398

(22) Filed: Dec. 21, 2023

(65) Prior Publication Data
US 2024/0235967 A1  Jul. 11, 2024

Related U.S. Application Data

(60) Provisional application No. 63/440,321, filed on Jan. 20, 2023, provisional application No. 63/437,277, filed on Jan. 5, 2023.

(51) Int. Cl.
*H04L 43/026* (2022.01)
*H04L 43/0888* (2022.01)

(52) U.S. Cl.
CPC ........ *H04L 43/026* (2013.01); *H04L 43/0888* (2013.01)

(58) Field of Classification Search
CPC ... H04L 43/026; H04L 43/0888; H04L 41/16; H04L 43/028

USPC .......................................................... 709/224
See application file for complete search history.

(56) References Cited

U.S. PATENT DOCUMENTS

| | | | |
|---|---|---|---|
| 10,194,303 B2 | 1/2019 | Wang et al. | |
| 10,620,854 B1 * | 4/2020 | James | G06F 3/067 |
| 11,513,772 B1 * | 11/2022 | Gross | H04L 67/10 |
| 11,616,728 B2 | 3/2023 | Karthikeyan et al. | |
| 11,652,691 B1 * | 5/2023 | Ramalingam | H04L 43/0888 709/221 |
| 11,677,668 B1 * | 6/2023 | Urias | H04L 43/18 709/224 |
| 11,689,944 B2 * | 6/2023 | Vasudevan | H04W 28/24 370/252 |
| 11,882,040 B2 | 1/2024 | Kimura et al. | |

(Continued)

FOREIGN PATENT DOCUMENTS

| | | | | |
|---|---|---|---|---|
| CN | 114301636 A | 4/2022 | | |
| KR | 10-2006-0059493 A | 6/2006 | | |
| WO | WO-2014209493 A1 * | 12/2014 | ........... | H04L 65/605 |

*Primary Examiner* — Karen C Tang
(74) *Attorney, Agent, or Firm* — BROADVIEW IP LAW, PC

(57) ABSTRACT

A method and apparatus for detecting network service types by grouping together applications that have similar latency requirement and data characteristics to form a service type. Machine learning algorithms may be used to detect the traffic pattern in the traffic stream by using features extracted from packet information and optionally additional sensor information. Subsequently, the output of the machine learning module may go through a post-processing process that may employ different techniques to use current prediction and past predictions to make a final decision about the network service type.

16 Claims, 30 Drawing Sheets

(56) References Cited

U.S. PATENT DOCUMENTS

| | | | | |
|---|---|---|---|---|
| 2007/0078958 | A1* | 4/2007 | Bennett | G06F 16/958 709/223 |
| 2014/0153392 | A1* | 6/2014 | Gell | H04W 28/0236 370/230 |
| 2018/0324061 | A1* | 11/2018 | Khanal | H04L 43/028 |
| 2019/0044981 | A1* | 2/2019 | Kielhofner | H04L 65/764 |
| 2019/0312815 | A1* | 10/2019 | Altman | H04L 43/0876 |
| 2020/0162503 | A1* | 5/2020 | Shurtleff | H04L 41/0883 |
| 2020/0186411 | A1* | 6/2020 | Ravichandran | H04L 41/40 |
| 2020/0313985 | A1* | 10/2020 | Jayakumar | H04L 41/40 |
| 2020/0322237 | A1* | 10/2020 | Luo | H04L 43/045 |
| 2020/0358674 | A1* | 11/2020 | Harikrishnan | H04L 43/0894 |
| 2021/0385683 | A1* | 12/2021 | Boyapalle | H04W 48/18 |
| 2023/0093193 | A1* | 3/2023 | Mathison | H04W 76/10 709/227 |
| 2023/0216760 | A1* | 7/2023 | Nguyen | H04L 67/535 |
| 2023/0308948 | A1* | 9/2023 | Jia | H04W 28/0967 |

* cited by examiner

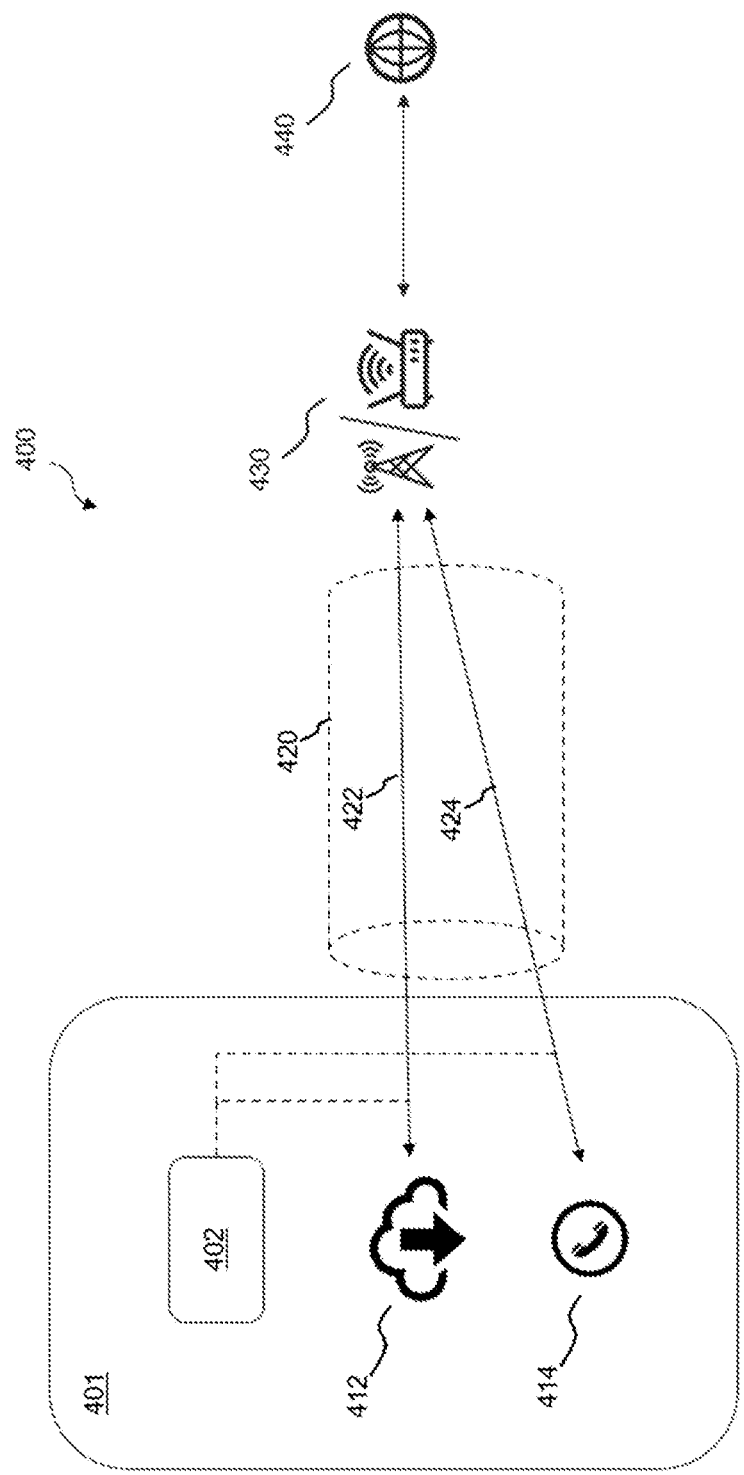

METHODS AND APPARATUS FOR DETECTING NETWORK SERVICES

CROSS-REFERENCE TO RELATED APPLICATIONS

This application claims the benefit of priority from U.S. Provisional Application No. 63/437,277, entitled "METHOD FOR DETECTING NETWORK SERVICES BASED ON SEGREGATED NETWORK TRAFFIC", filed Jan. 5, 2023, and U.S. Provisional Application No. 63/440,321, entitled "METHOD FOR DETECTING NETWORK SERVICES BASED ON SEGREGATED NETWORK TRAFFIC", filed Jan. 20, 2023, which are incorporated herein by reference in their entirety.

TECHNICAL FIELD

This disclosure relates generally to network services, and more particularly to, for example, but not limited to, detecting network services or network service types in a communication system based on segregated network traffic.

BACKGROUND

Network technologies, including wireless technology, have evolved toward increasing data rates and service types, and continue their growth in various markets such as home, enterprise and hotspots over the years. The service types include voice, data and video. There has been a growing need for identifying the types of services presented in a network traffic stream.

The description set forth in the background section should not be assumed to be prior art merely because it is set forth in the background section. The background section may describe aspects or embodiments of the present disclosure.

SUMMARY

One embodiment of the present disclosure may provide a network connected device. The network connected device may comprise a transceiver configured to receive network traffic from the network; a memory coupled to the transceiver; a processor coupled to the memory and the transceiver, the processor may be configured to: decompose the network traffic into one or more data flows based on source information and destination information; store the data flows in a traffic map, each entry of the traffic map includes a data flow identification and traffic information of the data flow in an observation time window; filter the stored data flows based on one or more traffic characteristics of the traffic information of the data flows; and determine a service type for each of the filtered data flows using machine learning.

In some embodiments, the source information may be a source Internet Protocol (IP) address or a source port, and the destination information may be a destination IP address or a destination port.

In some embodiments, the processor may be configured to filter the stored data flows based on a number of packets or a number of bytes in each of the stored data flows.

In some embodiments, the processor may be configured to filter the stored data flows based on traffic throughput in each of the stored data flows.

In some embodiments, the processor may be configured to: calculate a first throughput for the observation time window for each filtered data flow; and store filtered data flows that have a throughput greater than the first throughput in the traffic map.

In some embodiments, the processor may be configured to: based on a determination that the number of stored filtered data flows is greater than a first throughput threshold, remove a stored filtered data flow that has a smallest throughput.

In some embodiments, the processor may be configured to: calculate a second throughput for a second observation time window for each stored filtered data flow, wherein the second observation time window is longer than the observation time window; and based on a determination that the second throughput of a stored filtered data flow is less than a second throughput threshold, remove the stored data flow from the traffic map.

In some embodiments, the processor may be configured to receive information from one or more sensors of the network connected device and filter the stored filtered data flows including the information from the one or more sensors.

In some embodiments, the processor may be configured to use a multi-layer machine learning model having a first layer and a second layer, wherein the first layer of the multi-layer machine learning model determines the service type and the second layer of the multi-layer machine learning model further divides the service type into sub-categories.

In some embodiments, the processor may be further configured to receive current information from one or more sensors of the network connected device and determine the service type including the current information from the one or more sensors.

One embodiment of the present disclosure may provide a method for detecting network service types. The method may comprise: receiving network traffic from a transceiver; decomposing the network traffic into one or more data flows based on source information and destination information; storing the data flows in a traffic map in a memory, each entry of the traffic map includes a data flow identification and traffic information of the data flow in an observation time window; filtering the stored data flows based on one or more traffic characteristics of the traffic information of the data flows; and determining a service type for each of the filtered data flows using machine learning.

In some embodiments, the source information may be a source Internet Protocol (IP) address or a source port, and the destination information may be a destination IP address or a destination port.

In some embodiments, the filtering the stored data flows may be based on a number of packets or a number of bytes in each of the stored data flows.

In some embodiments, the filtering the stored data flows may be based on a traffic throughput in each of the stored data flows.

In some embodiments, the method may comprise calculating a first throughput for the observation time window for each filtered data flow; and storing filtered data flows that have throughput greater than the first throughput in the traffic map.

In some embodiments, the method may comprise, based on a determination that the number of stored filtered data flows is greater than a first throughput threshold, removing a stored filtered data flow that has a smallest throughput.

In some embodiments, the method may comprise calculating a second throughput for a second observation time window for each stored filtered data flow, wherein the second observation time window is longer than the observation time window; and based on a determination that the second throughput of a stored filtered data flow is less than a second throughput threshold, removing the stored data flow from the traffic map.

In some embodiments, the method may comprise receiving information from one or more sensors of the network connected device and filtering the stored filtered data flows including the information from the one or more sensors.

In some embodiments, the method may comprise using a multi-layer machine learning model having a first layer and a second layer, wherein the first layer of the multi-layer machine learning model determines the service type and the second layer of the multi-layer machine learning model further divides the service type into sub-categories.

In some embodiments, the method may comprise receiving current information from one or more sensors of the network connected device and determine the service type including the current information from the one or more sensors.

BRIEF DESCRIPTION OF THE DRAWINGS

FIG. 4 shows an example of a wireless network in which the present disclosure may operate in accordance with an embodiment.

Figure 1:
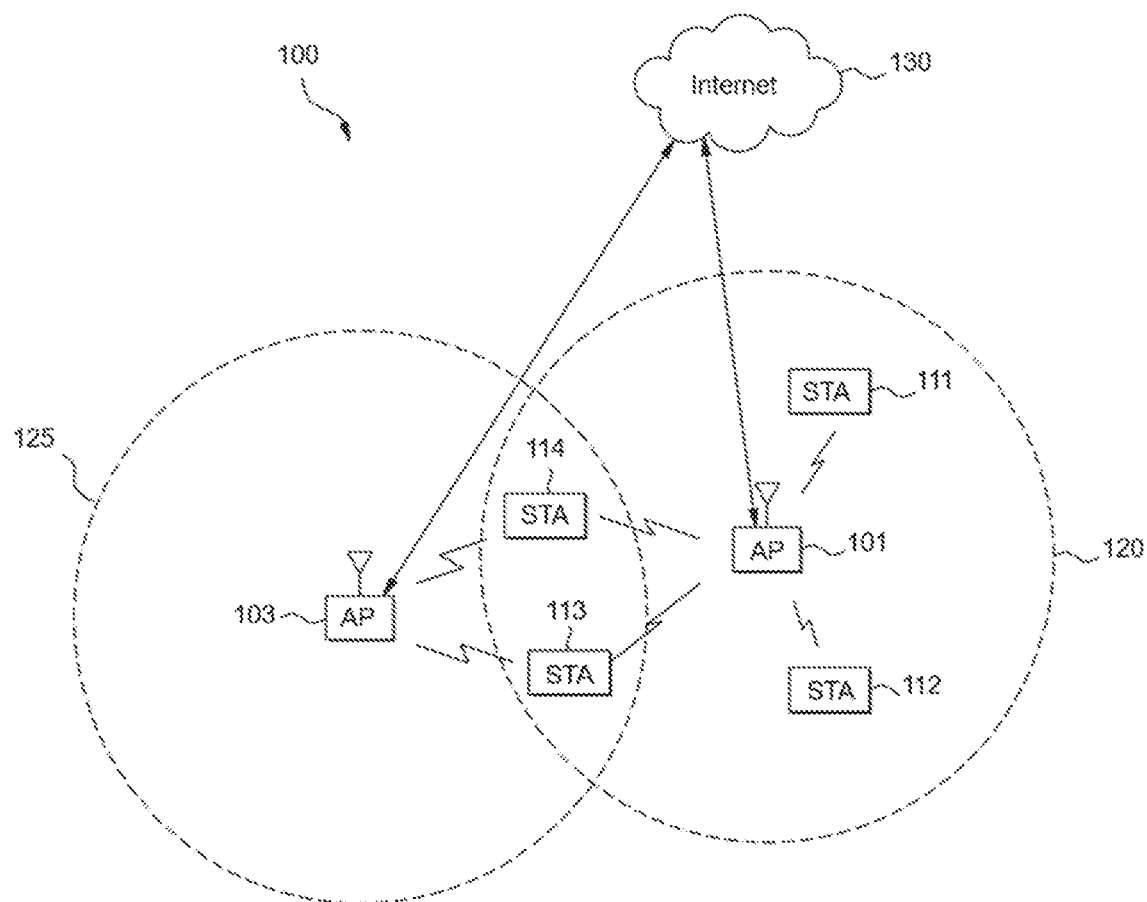
FIG. 1 shows an example of a wireless network in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The present disclosure relates to communication systems, including, but not limited to, wireless communication systems, for example, to a Wireless Local Area Network (WLAN) technology. WLAN allows devices to access the internet in the 2.4 GHZ, 5 GHZ, 6 GHz or 60 GHZ frequency bands. WLANs are based on the Institute of Electrical and Electronic Engineers (IEEE) 802.11 standards. IEEE 802.11 family of standards aim to increase speed and reliability and to extend the operating range of wireless networks.

Although examples and descriptions below may depict wireless communication systems, the present disclosure is applicable to both wired and wireless technologies. As such, references to wireless devices, systems and processes may be similarly applicable to wired counterparts.

The following description is directed to certain implementations for the purpose of describing the innovative aspects of this disclosure. However, a person having ordinary skill in the art will readily recognize that the teachings herein may be applied in a multitude of different ways. The described embodiments may be implemented in any device, system or network that is capable of transmitting and receiving signals, for example, radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

The demand for data traffic continues to grow. For example, the demand for wireless data traffic is rapidly increasing due to the growing popularity among consumers and businesses of smart phones and other mobile data devices, such as tablets, "note pad" computers, net books, eBook readers, and machine type of devices. With this growth there is thus the desire to identify the type of services presented in a network traffic stream. Being able to detect the service type of traffic flows may be essential to a wide range of applications, for example, traffic prioritization, controlling 802.11ax Target Wake Time function, dynamic scheduling, quality of service ensuring, abnormality detection, etc. Early approaches relying on DPI (Deep Packet Inspection) and packet port numbers have become less feasible since modern network traffic is often encrypted. This has necessitated the desire to segregate the traffic based on, for example, the conversations between endpoints, then extract features from the packet information and map the traffic pattern to the correct service categories using machine learning algorithms.

Generally, the present disclosure may enable reliable methods and systems to identify multiple types of services when presented in a traffic stream. A network traffic stream sometimes can contain not just one type of service but multiple types. For example, given a scenario where a user interacts with his/her mobile device, he/she can simultaneously be downloading a large file and making an internet phone call. In this scenario, the network stream contains two types of services. When there is a need to identify these service types, current approaches cannot identify multiple service types in a traffic stream. The present disclosure supports the detection of multiple services.

Being able to do this may also enable more applications and/or functionalities such as service prioritization, traffic throttling and power management. The ability to automatically analyze the network traffic to identify the services may be highly valuable for a wide range of functionalities including network resource management, quality of service, dynamic access control, power saving, and others. These abilities in turn facilitate efficient communication and reliable data transportation which may open the doors for even further technologies to be developed.

FIG. 1 shows an example of a wireless network 100, in accordance with some embodiments, in which the present disclosure may operate. The embodiment of the wireless network 100 shown in FIG. 1 is for illustrative purposes only. Other embodiments of the wireless network 100 may be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 may communicate with at least one network 130, such as the Internet, a proprietary Internet Protocol (IP) network, or other data network. The AP 101 provides wireless access to the network 130 for a plurality of stations (STAs) 111-114 with a coverage arca 120 of the AP 101. The APs 101 and 103 may communicate with each other and with the STAs using Wi-Fi or other WLAN communication techniques.

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 may include any number of APs and any number of STAs in any suitable arrangement. Also, the AP 101 may communicate directly with any number of STAs and provide those STAs with wireless broadband access to the network 130. Similarly, each AP 101 and 103 may communicate directly with the network 130 and provides STAs with direct wireless broadband access to the network 130. Further, the APs 101 and/or 103 may provide access to other or additional external networks, such as external telephone networks or other types of data networks.

Figure 2:
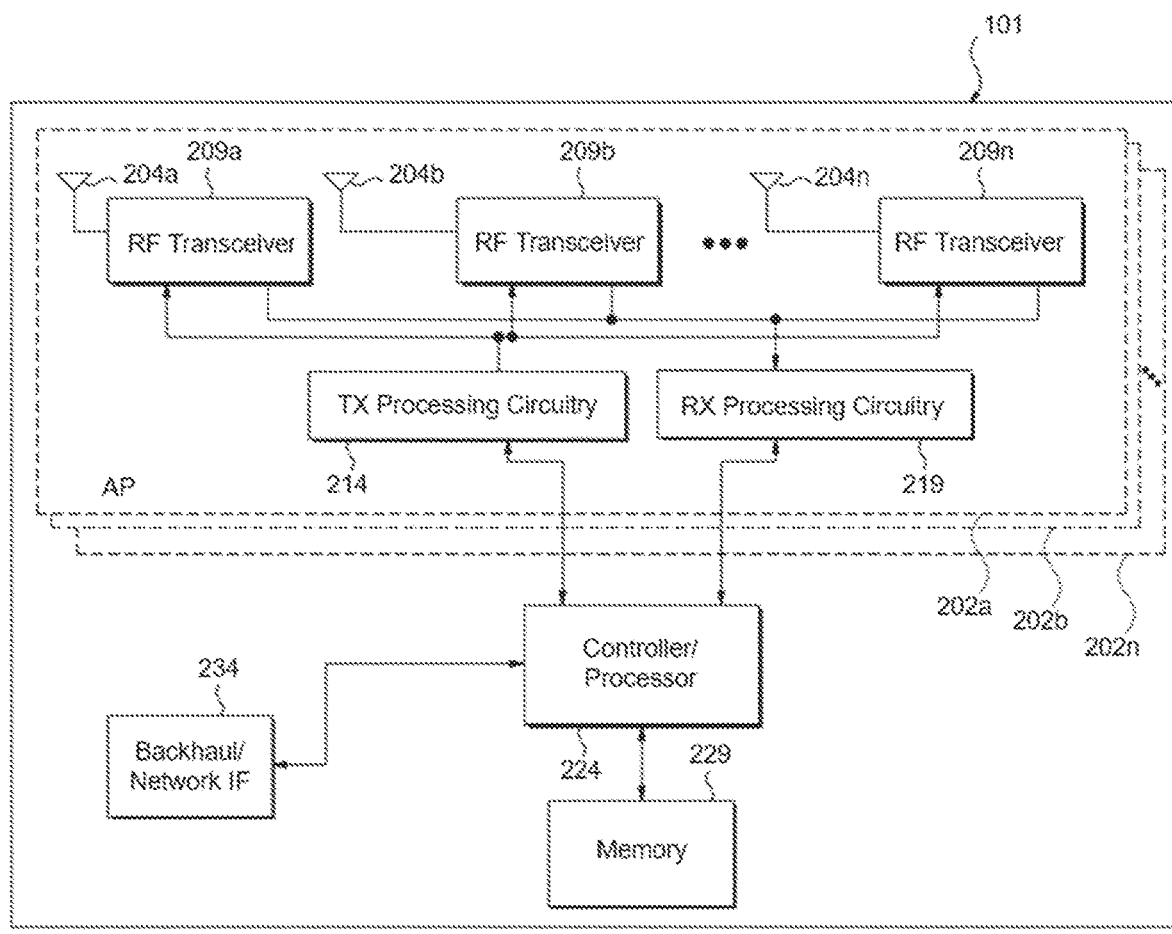
FIG. 2 shows an example of an AP in accordance with an embodiment.

FIG. 2 shows an example of an AP 101 in accordance with some embodiments. The embodiment of the AP 101 shown in FIG. 2 is for illustrative purposes, and the AP 103 of FIG. 1 may have the same or similar configuration. However, APs come in a wide range of configurations, and FIG. 2 does not limit the scope of this disclosure to any particular implementation of an AP.

As shown in FIG. 2, the AP 101 may include multiple antennas 204a-204n, multiple radio frequency (RF) transceivers 209a-209n, transmit (TX) processing circuitry 214, and receive (RX) processing circuitry 219. The AP 101 may also include a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 may include one or more processors or other processing devices that control the overall operation of the AP 101. For example, the controller/processor 224 may control the reception of uplink signals and the transmission of downlink signals by the RF transceivers 209a-209n, the RX processing circuitry 219, and the TX processing circuitry 214 in accordance with well-known principles. The controller/processor 224 may support additional functions as well, such as more advanced wireless communication functions. For instance, the controller/processor 224 may support beam forming or directional routing operations in which outgoing signals from multiple antennas 204a-204n are weighted differently to effectively steer the outgoing signals in a desired direction. The controller/processor 224 may also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 may also be capable of executing programs and other processes resident in the memory 229, such as an OS. The controller/processor 224 may move data into or out of the memory 229 as required by an executing process.

The controller/processor 224 may also be coupled to the backhaul or network interface 234. The backhaul or network interface 234 may allow the AP 101 to communicate with other devices or systems over a backhaul connection or over a network. The interface 234 may support communications over any suitable wired or wireless connection(s). For example, the interface 234 may allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 may be coupled to the controller/processor 224. Part of the memory 229 may include a RAM, and another part of the memory 229 may include a Flash memory or other ROM.

As described in more detail below, the AP 101 may include circuitry and/or programming for management of channel sounding procedures in WLANs. Although FIG. 2 illustrates one example of AP 101, various changes may be made to FIG. 2. For example, the AP 101 may include any number of each component shown in FIG. 2. As a particular example, an AP may include a number of interfaces 234, and the controller/processor 224 may support routing functions to route data between different network addresses. As another example, while shown as including a single instance of TX processing circuitry 214 and a single instance of RX processing circuitry 219, the AP 101 may include multiple instances of each (such as one per RF transceiver). Alternatively, only one antenna and RF transceiver path may be included, such as in legacy APs. Also, various components in FIG. 2 may be combined, further subdivided, or omitted and additional components may be added according to particular needs.

As shown in FIG. 2, in some embodiments, the AP 101 may be an AP MLD that includes multiple APs 202a-202n. Each AP 202a-202n is affiliated with the AP MLD 101 and may include multiple antennas 204a-204n, multiple radio frequency (RF) transceivers 209a-209n, transmit (TX) processing circuitry 214, and receive (RX) processing circuitry 219. Each APs 202a-202n may independently communicate with the controller/processor 224 and other components of the AP MLD 101. FIG. 2 shows that each AP 202a-202n has separate multiple antennas, but each AP 202a-202n may share multiple antennas 204a-204n without needing separate multiple antennas. Each AP 202a-202n may represent a physical (PHY) layer and a lower media access control (MAC) layer.

Figure 3:
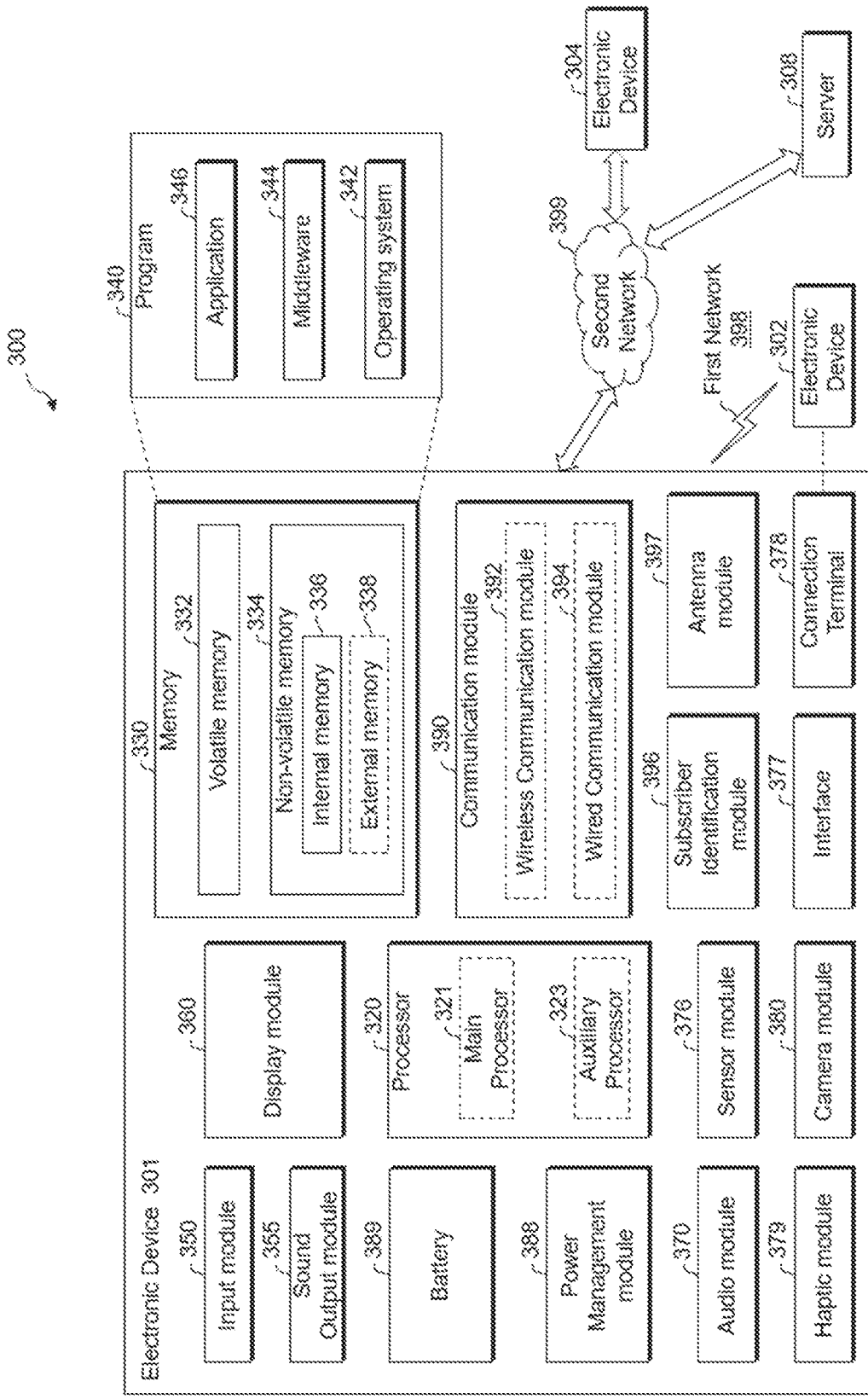
FIG. 3 shows an example of a STA in accordance with an embodiment.

FIG. 3 shows an example of a STA 111 in accordance with some embodiments. The embodiment of the STA 111 shown in FIG. 3 is for illustrative purposes, and the STAs 111-114 of FIG. 1 may have the same or similar configuration. However, STAs come in a wide variety of configurations, and FIG. 3 does not limit the scope of this disclosure to any particular implementation of a STA.

In the example of FIG. 3, the STA may be an electronic device 301, for example, a mobile device (such as a mobile telephone, a smartphone, etc.) or a stationary device (such as a desktop computer, AP, or a media player, etc.).

As shown in FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The first network 398 or the second network 399 may be, for example, a wireless local area network (WLAN) conforming IEEE 802.11be standard or any future amendments to IEEE 802.11 standard.

According to some embodiments, the electronic device 301 may communicate with the electronic device 304 via the server 308. According to some embodiments, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments, at least one of the components (e.g., the connecting terminal 378) may be omitted from the electronic device 301, or one or more other components may be added in the electronic device 301. In some embodiments, some of the components (e.g., the sensor module 376, the camera module 30, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320 and may perform various data processing or computation. According to some embodiments, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to some embodiments, the processor 320 may include a main processor 321 (e.g., a central processing unit (CPU) or an application processor), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to some embodiments, the auxiliary processor 323 (e.g., an ISP or a CP) may be implemented as part of another component (e.g., the camera module 380 or the communication module 390) functionally related to the auxiliary processor 323. According to some embodiments, the auxiliary processor 323 (e.g., the NPU) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or one or more applications 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing recorded data. The receiver may be used for receiving incoming calls. According to some embodiments, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to some embodiments, the display module 360 may include a touch sensor adapted to detect a touch, or a pressure sensor adapted to measure the intensity of force incurred by the touch.

The audio module 370 may convert a sound into an electrical signal and vice versa. According to some embodiments, the audio module 370 may obtain the sound via the input module 350 or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to some embodiments, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to some embodiments, the interface 377 may include, for example, a high-definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to some embodiments, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to some embodiments, the camera module 380 may include one or more lenses, image sensors, ISPs, or flashes.

The power management module 388 may manage power supplied to the electronic device 301. According to some embodiments, the power management module 388 may be implemented as at least part of, for example, a power management integrated circuit (PMIC).

The battery 389 may supply power to at least one component of the electronic device 301. According to some embodiments, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more CPs that are operable independently from the processor 320 (e.g., the application processor) and supports a direct (e.g., wired) communication or a wireless communication. According to some embodiments, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, Wi-Fi direct, or IR data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the SIM 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mm Wave band) to achieve, e.g., a high data transmission rate. The wireless communication module 392 may support various technologies for securing performance on a high-frequency band, such as, e.g., beamforming, massive multiple-input and multiple-output (MIMO), full dimensional MIMO (FD-MIMO), array antenna, analog beam-forming, or large-scale antenna. The wireless communication module 392 may support various requirements specified in the electronic device 301, an external electronic device (e.g., the electronic device 304), or a network system (e.g., the second network 399). According to some embodiments, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to some embodiments, the mmWave antenna module may include a PCB, a RFIC disposed on a first surface (e.g., the bottom surface) of the PCB, or adjacent to the first surface and capable of supporting a designated high-frequency band (e.g., the mm Wave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to some embodiments, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to some embodiments, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra-low-latency services using, e.g., distributed computing or MEC. In another embodiment, the external electronic device 304 may include an Internet-of-things (IOT) device. The server 308 may be an intelligent server using machine learning and/or a neural network. According to some embodiments, the external electronic device 304 or the server 308 may be included in the second network 399. The electronic device 301 may be applied to intelligent services (e.g., smart home, smart city, smart car, or healthcare) based on 5G communication technology or IoT-related technology.

As mentioned herein, a network stream may contain multiple types of services. A service (or network service) may be a function provided over a network infrastructure that facilitates application-level interactions and data exchanges, in a network data stream (or network stream), between connected devices. A network stream may include voice, video and data traffic. Generally, at a high-level description, the present disclosure provides a network detection service that may accurately identify different types of services in a network stream. In some embodiments, the network detection service may be implemented in a user device, such as user device 300.

FIG. 4 shows an example of a wireless network 400, in accordance with some embodiments, in which the present disclosure may operate. The embodiment of the wireless network 400 shown in FIG. 4 is for illustrative purposes only. Other embodiments of the wireless network 400 may be used without departing from the scope of this disclosure. Although the example in FIG. 4 shows a wireless network, the principles of this disclosure may also be implemented in a wired network.

As shown in FIG. 4, the wireless network 400 may include a user device 401 (similar to electronic device 301), which may connect to the Internet 440 through an AP or cellular device 430. In this example, the user device 401 is shown with two running applications 412 and 414. Application 412 may be performing file downloading function, for example, cloud storage file downloading. Application 414 may be a voice call, for example, a Voice-over-IP (VOIP) call. For simplicity, data traffic between the applications 412 and 414 and the upstream network devices are shown in network stream 420. The network stream 420 thus includes both data traffic flow 422 for application 412 and data traffic flow 424 for application 414. Using the data traffic flows 422 and 424, a network detection service 402 may detect or predict the service type of each of the data traffic flows. In this example, the network detection service 402 may predict that the service type on data traffic flow 422 is of non-real-time type, and service type on data traffic flow 424 is of real-time type.

Figure 5A:
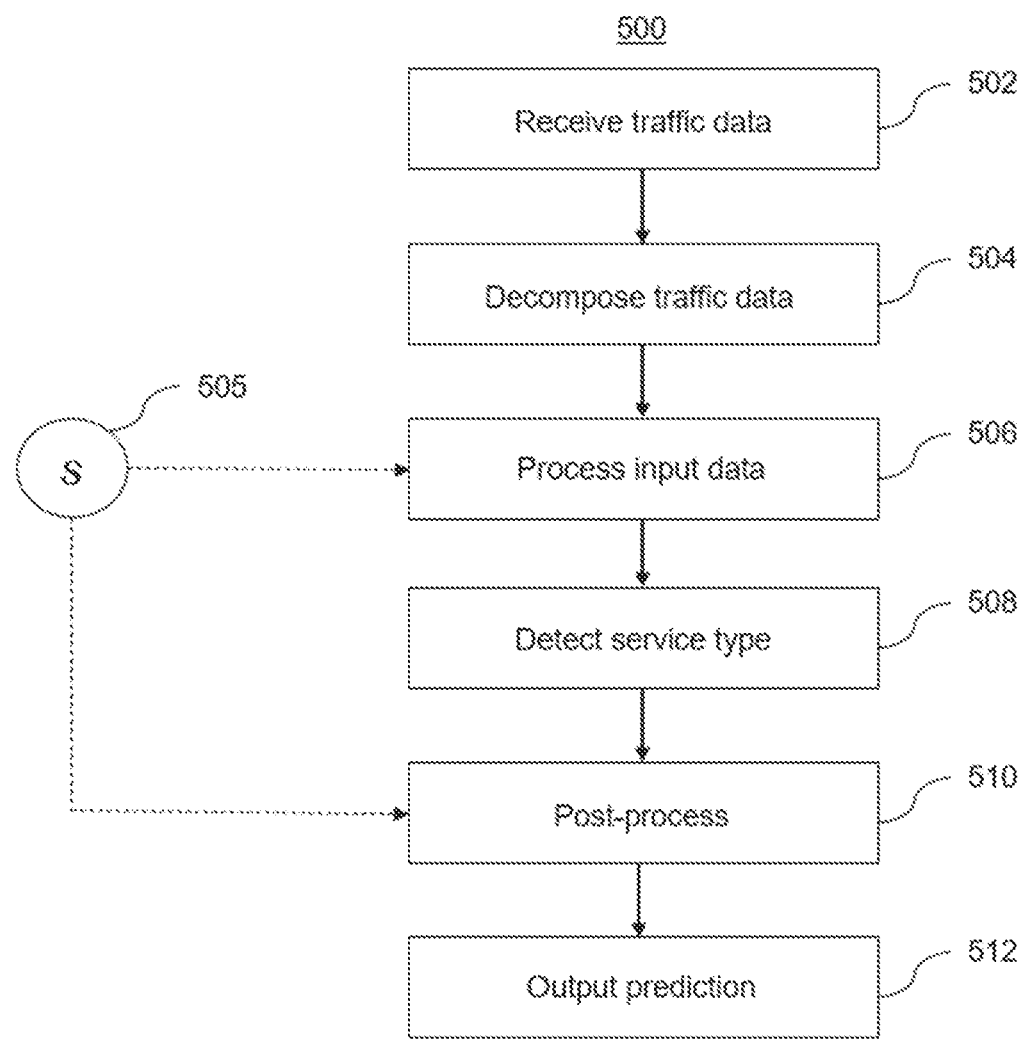
FIG. 5A shows an example of a high-level flow diagram of a process for network service detection in accordance with an embodiment.

FIG. 5A shows an example of a high-level flow diagram depicting a process 500 for network service detection (or NSD), in accordance with some embodiments. In some embodiments, to detect the type of network services in a traffic stream, the process 500 may group together applications that have similar latency requirement and traffic and data characteristics to form a service type (such as video call, audio call, etc.). These service types may be pre-defined. The process 500 may then use machine learning algorithms to detect the traffic pattern in the traffic stream, for example, by using features extracted from packet information and optionally additional sensor information. Subsequently, the output of the machine learning algorithm may go through a post-processing process that may employ different techniques to use current prediction and past predictions to make a final decision about the network service type. The post-processing process may be a logic-based post-processing process that may use a current prediction and past predictions.

In operation 502, the user device may receive network traffic data stream, for example, traffic stream 420 shown in FIG. 4.

In operation 504, the network traffic stream may be decomposed to produce multiple, smaller traffic flows. In some embodiments, the process 500 may track the packets (e.g., by a packet tracker module or unit) in the stream then group them, for example, according to the quintuple rules (e.g., source IP address, source port, destination IP address, destination port, and transport layer protocol), thus segmenting the stream into individual traffic flows, for example, traffic flows 422 and 424 shown in FIG. 4. The individual traffic flows may be referred to as conversations. It should be noted that the decomposition process may be performed without interaction with or assistance from the final destination of the packets (e.g., an application).

In operation 506, the process 500 may include a pipeline with a caching mechanism that manages and maintains data for all active decomposed traffic flows. Optional sensor information 505 may be received for processing during operation 506. The sensor information may include, for example, camera usage, speaker usage, touch screen interaction rate, presence of active game application, etc.

In some embodiments, the process 500 may extract features from the traffic flows. The features may include, for example, packet information (e.g., packet count, Transmission Control Protocol (TCP) packet count, User Datagram Protocol (UDP) packet count, average packet size, etc.), and packet timing information (e.g., interval-packet arrival time) in each predetermined observation time window.

For brevity, the observation time window may be referred to herein as observation window, observation time, time window, or window.

In operation 508, the process 500 may categorize the service type associated with each conversation. In some embodiments, the process 500 may employ machine learning (ML) techniques on the network traffic statistics derived from the conversations' traffic flow, to accurately categorize the service type associated with each conversation. The process 500 may perform a single or a series of machine learning algorithms on the traffic features extracted from the segregated traffic flows, and any additional sensor information.

In operation 510, the process 500 may predict one or more service type(s) presented in the composite traffic stream. In some embodiments, the process 500 may include rule-base processing to examine and make decision using the instantaneous detected type of the individual component flows, their historical predicted labels, and additional sensor information 505. The sensor information may include, for example, camera usage, speaker usage, touch screen interaction rate, presence of active game application, etc.

In operation 512, the process 500 may produce the prediction resulted from operation 510.

Figure 5B:
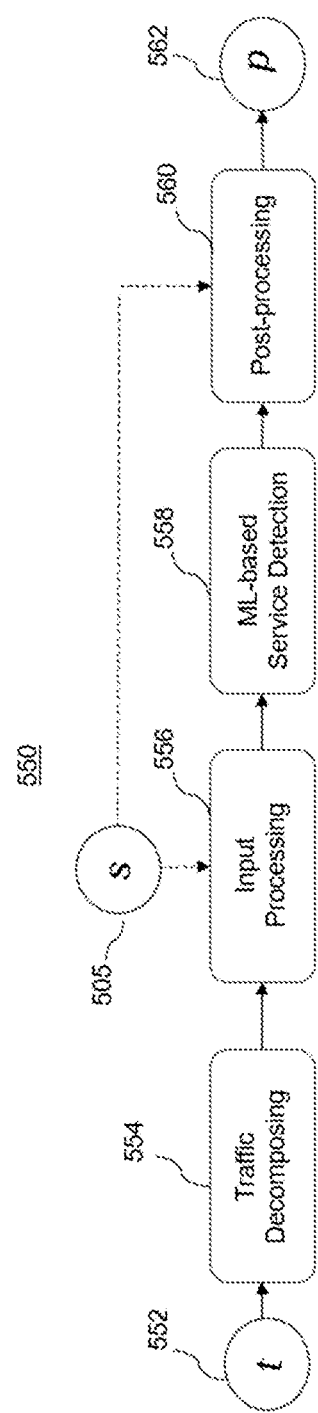
FIG. 5B shows an example of a high-level diagram of a system for network service detection in accordance with an embodiment.

FIG. 5B shows an example of a high-level diagram depicting a system 550 for network service detection, in accordance with some embodiments. In some embodiments, the system 550 may include a traffic decomposing unit or module 554 that may receive traffic stream 552 perform operation 504 as described above. An input processing unit or module 556 may receive input from the traffic decomposing unit or module 554 and perform operation 506 described above. The input processing unit or module 556 may also receive sensor information 550. A machine learning based service detection unit or module 558 may receive input from the input processing unit or module 556 and perform operation 508 as described above. A rule-based post-processing unit or module 560 may receive input from the machine learning based service detection unit or module 558 and perform operation 510 to generate prediction 562 as described above. The machine learning based service detection unit or module 558 may also receive sensor information 505.

As used herein and in the drawings, the terms input processing unit or module and input processor may be used interchangeably; the terms post-processing unit or module and post processor may be used interchangeably; and the terms service detecting/detection module or unit and service detector may be used interchangeably. Also as used herein, the term feature and information may be used interchangeably.

Figure 5C:
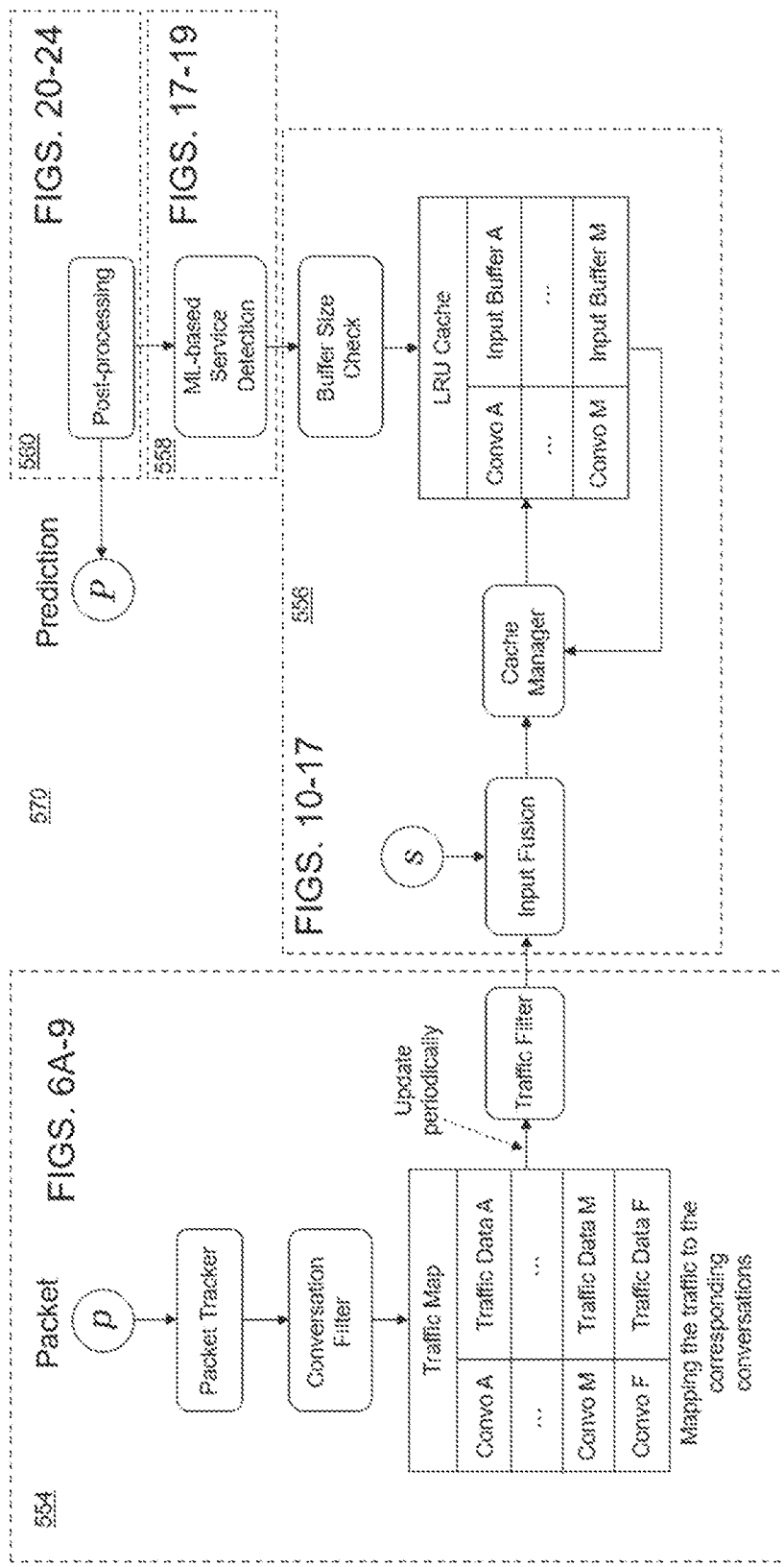
FIG. 5C shows an example of a detailed diagram of a system for network service detection in accordance with an embodiment.

FIG. 5C shows an example of a diagram 570 depicting a detailed system 550 for network service detection, in accordance with some embodiments. FIG. 5C is provided for convenience only. The details of each component will be described in further detail below. For example, the details of the traffic decomposing unit or module 554 will be described further in relation to FIGS. 6A-9. The details of the input unit or module 556 will be described further in relation to FIGS. 10-17. The details of the ML-based service detection module or unit 558 will be described further in relation to FIGS. 17-19. The details of the post-processing unit or module 560 will be described further in relation to FIGS. 20-24.

Figure 6A:
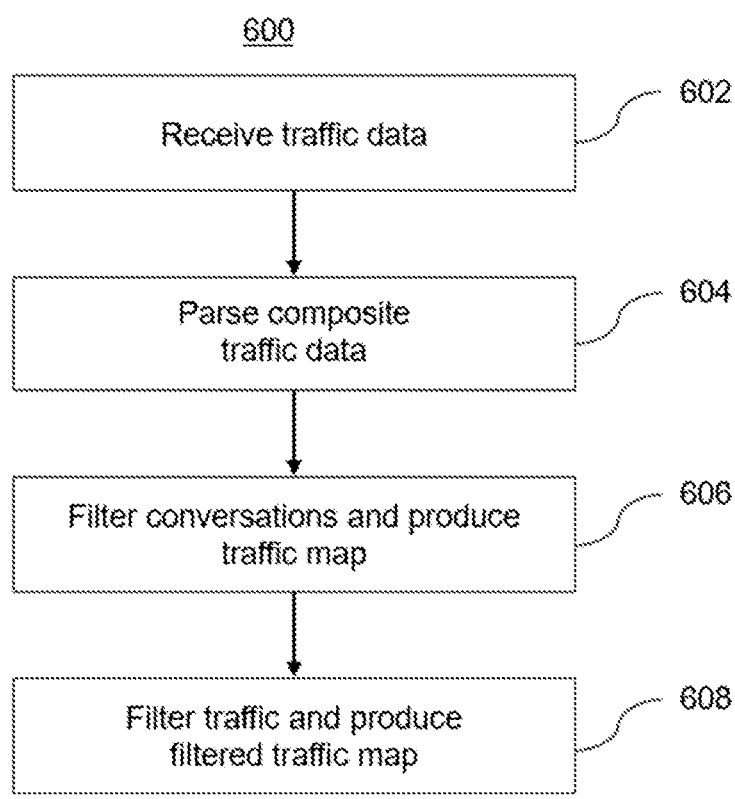
FIG. 6A shows an example of a flow diagram of a traffic decomposing process in accordance with an embodiment.

FIG. 6A shows an example of a flow diagram depicting a traffic decomposing process 600 for network service detection, in accordance with some embodiments. The process 600 discloses further details for the operation 504 as shown in FIG. 5A. In some embodiments, the traffic decomposing process 600 may separate (or decompose) a traffic stream into multiple smaller traffic flows for detecting network service(s) in the traffic stream.

In operation 602, the process 600 may receive network traffic data stream, for example, traffic stream 420 shown in FIG. 4.

In operation 604, the process 600 may decompose the composite traffic data in the traffic stream. In some embodiments, the process 600 may extract information from the raw packet data in the stream and parse the packet header information to get the source and destination addresses. The stream may be separated into flows, each includes two endpoint addresses, for example, address$_A$ (e.g., source address) and address$_B$ (e.g., destination address). Each flow may be referred to as a conversation, combining the two endpoints' addresses, convo=(address$_A$, address$_B$). The addresses may be IP addresses, MAC addresses, or port numbers.

In operation 606, the process 600 may group packets belonging to a conversation together. In some embodiments, a traffic map may be used to match the traffic to its corresponding conversation within a time interval. The time interval may be referred to as a burst b or a time step which can be previously set with a predetermined value. The value may be within a range, for example, within 300 to 700 ms. In some embodiments, the default value of b may be set to 500 ms. In some embodiments, the traffic map may be implemented using data structures such as a hash map or a dictionary, but other data structures may also be used.

Figure 6B:
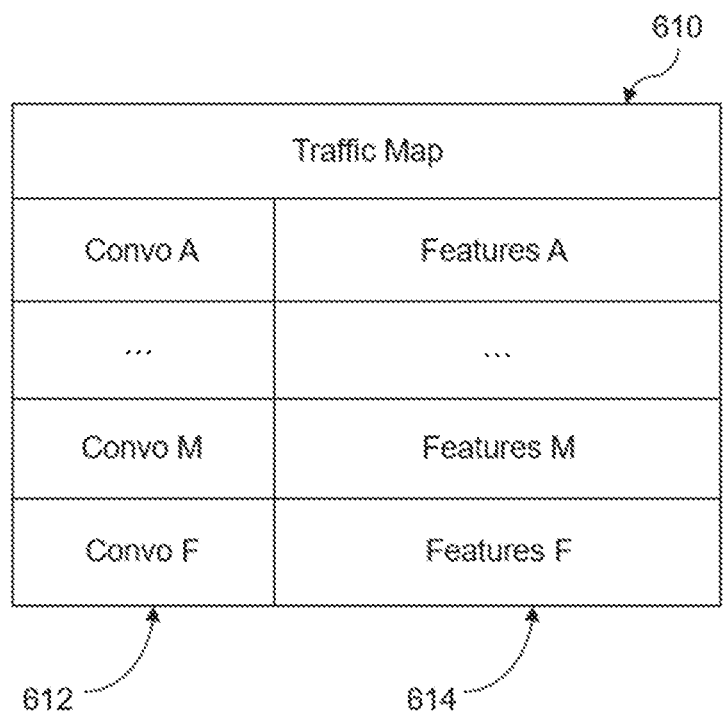
FIG. 6B shows an example of a traffic map in accordance with an embodiment.

FIG. 6B shows an example of a traffic map 610. In some embodiments, the traffic map 610 may include a list of conversations 612 and their corresponding information (shown as features) 614. It should be noted that the conversation information may be referred to herein as features. These features may be used in machine learning models as described in further details below.

In some embodiments, for every burst b, for example every 500 ms, the process 600 may parse the packets' headers and group them into conversations 612. For example, shown as Convo A, Convo M, Convo F, etc., in FIG. 6B. At this point, for each conversation, the features 614 may be calculated. For example, shown as Features A, Features M, Features F, corresponding to Convo A, Convo M, Convo F respectively. These features may be obtained from the packet information and packet timing information. Examples of the features may include, but not limited to:

Uplink & downlink maximum inter-arrival time: the maximum time difference between arrival of one packet and the next packet within a burst (2 values, one for uplink and one for downlink).

Uplink & downlink average inter-arrival time: the average time difference between arrival of one packet and the next packet within a burst (2 values, one for uplink and one for downlink).

Uplink & downlink packet counts: The uplink and downlink number of packets within a burst (2 values, one for uplink and one for downlink).

Uplink & downlink minimum packet size: The uplink and downlink minimum packet size in megabytes (Mb) within a burst (2 values, one for uplink and one for downlink).

Uplink & downlink maximum packet size: The uplink and downlink maximum packet size in Mb within a burst (2 values, one for uplink and one for downlink).

Uplink & downlink average packet size: The uplink and downlink average packet size in Mb within a burst (2 values, one for uplink and one for downlink).

Uplink & downlink UDP packet counts: The uplink and downlink number of User Datagram Protocol packets within a burst (2 values, one for uplink and one for downlink).

Uplink & downlink TCP packet counts: The uplink and downlink number of Transmission Control Protocol packets within a burst (2 values, one for uplink and one for downlink).

In some embodiments, the process 600 may update the traffic map 610 with the extracted features. In some embodiments, the process 600 may use the conversion as a key, for example, in looking up information and managing the traffic map.

Return to FIG. 6A, in operation 608, the process 600 may also use one or more filter mechanisms described below to remove conversations from or keep conversations in the traffic map 610. In some implementations, the mechanisms described below may be used sequentially.

In some embodiments, broadcast or multicast conversations may be removed. These conversations may be determined to not have much value for the detection of the service type(s). Broadcast conversations may include, for example, those that have an Internet Protocol version 4 (IPv4) address that have the last fields equal to 255. Multicast conversations may include, for example, those that have an IPV4 address that are within the range of 244.0.0.0 to 239.255.255.255. In some embodiments, these conversations may not be used for the detection of the services.

Figure 6C:
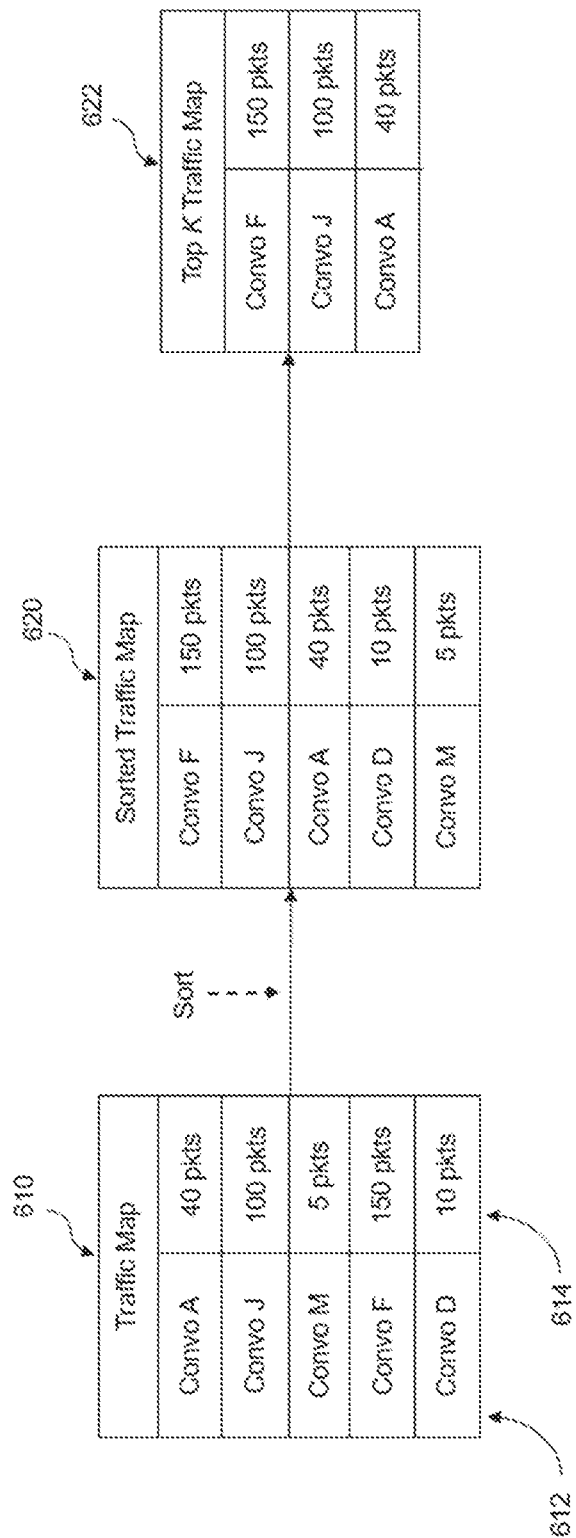
FIG. 6C shows an example of a diagram of a conversation filtering in accordance with an embodiment.

In some embodiments, conversations having values below a threshold may be removed. As shown in FIG. 6C, in some embodiments, the process 600 may keep the top k number of conversations in the traffic map 610 for tracking, where k is an integer number greater than 0. Conversations not in the top k number may be determined to be background conversations that have low value in terms of detecting the service type(s). In some implementations, the criteria to pick the top k conversations may include the total number of packets. In this example, a feature in the traffic map 610 includes the number of packets for the corresponding conversation within a time interval. For example, conversation Convo A has 40 packets (pkts), Convo J has 100 packets, and so on. The process 600 may sort the traffic map 610 using the packet count as key, producing sorted traffic map 620. From the sorted traffic map 620, the process 600 may keep only the top k (e.g., k=3) conversations, shown in traffic map 622. Although a sort algorithm is shown, other algorithms may be used to select the top k conversations.

Figure 6D:
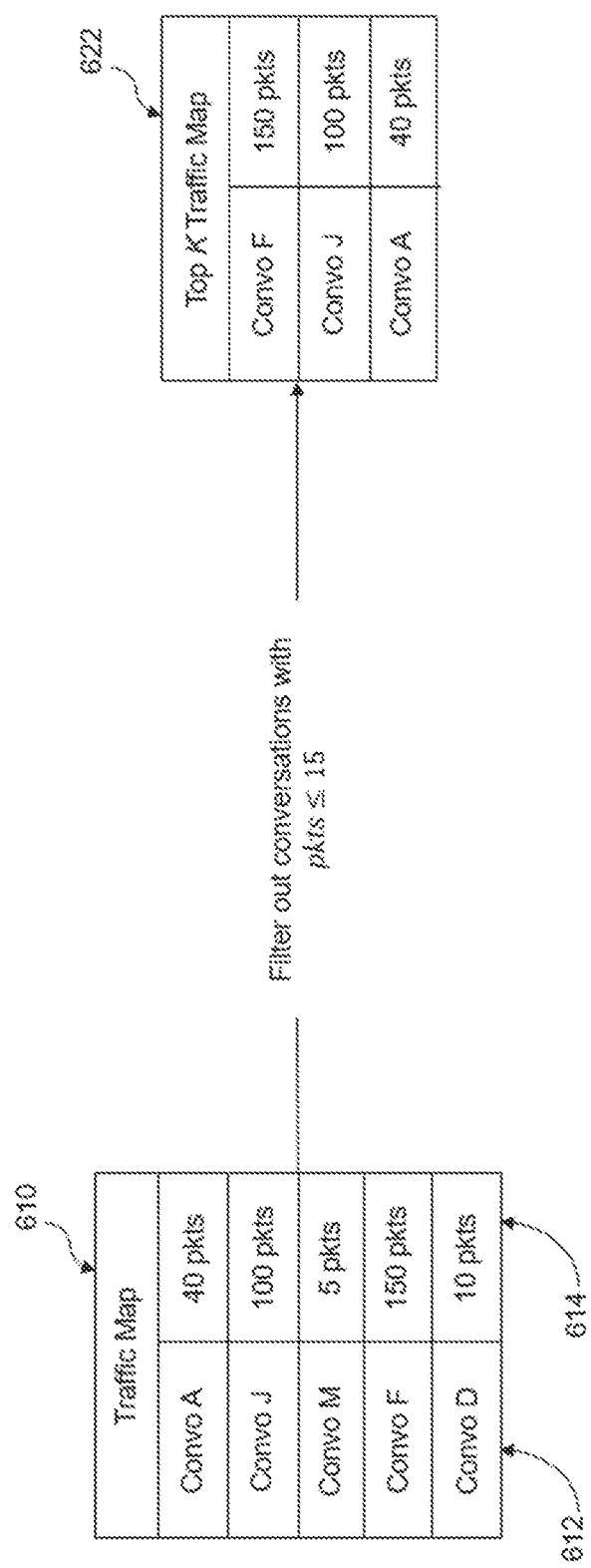
FIG. 6D shows an example of a diagram of another conversation filtering in accordance with an embodiment.

In some embodiments, the process 600 may filter out conversations without using a sort process. FIG. 6D shows an example of a process 600 filtering out conversations having less than 15 packets count, without going through a sort operation. For example, the traffic map 622 may be derived from the traffic map 610 directly without the sort operation of FIG. 6E.

In some implementations, the criteria to pick the top k number of conversations may include the total size of the data chunk computed by the sum of the size of all the packets for each conversation. The process using this criteria may be similar to the process described using the packet count above. For example, the total size of the data chunk for the conversations may be sorted, then the process 600 may keep the top k conversations with the largest sizes.

Other criteria for picking the top k number of conversations may also be used.

Figure 6E:
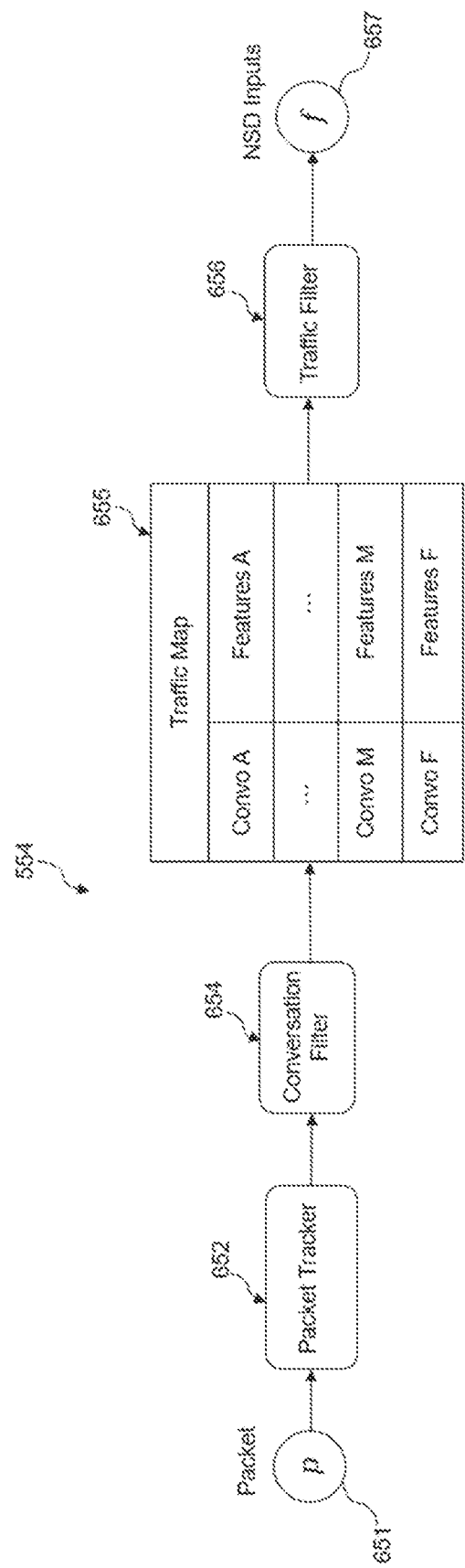
FIG. 6E shows an example of a high-level diagram of a traffic decomposing system in accordance with an embodiment.

FIG. 6E shows an example of a high-level diagram depicting further details for the traffic decomposing module or unit (or traffic decomposing unit for brevity) 554 as shown in FIG. 5B, in accordance with some embodiments. In some embodiments, the traffic decomposing unit 554 may perform the operations described in FIG. 6A.

In some embodiments, the traffic decomposing unit 554 may include a packet tracker module or unit 652 that may perform, among others, operations 602 and 604 as described above, where traffic data 651 may be received and processed. The traffic decomposing unit 554 may also include a conversation filter module or unit 654 that may perform, among others, operation 606 as described above, where a traffic map 655 may be produced. The traffic decomposing unit 554 may also include a traffic filter module or unit 656 that may perform, among others, operation 608 as described above, where output 657 may be produced. The output 657 may be inputted into an input processor system described in more detail herein. In some embodiments, conversations may be filtered based on throughput.

Figure 7:
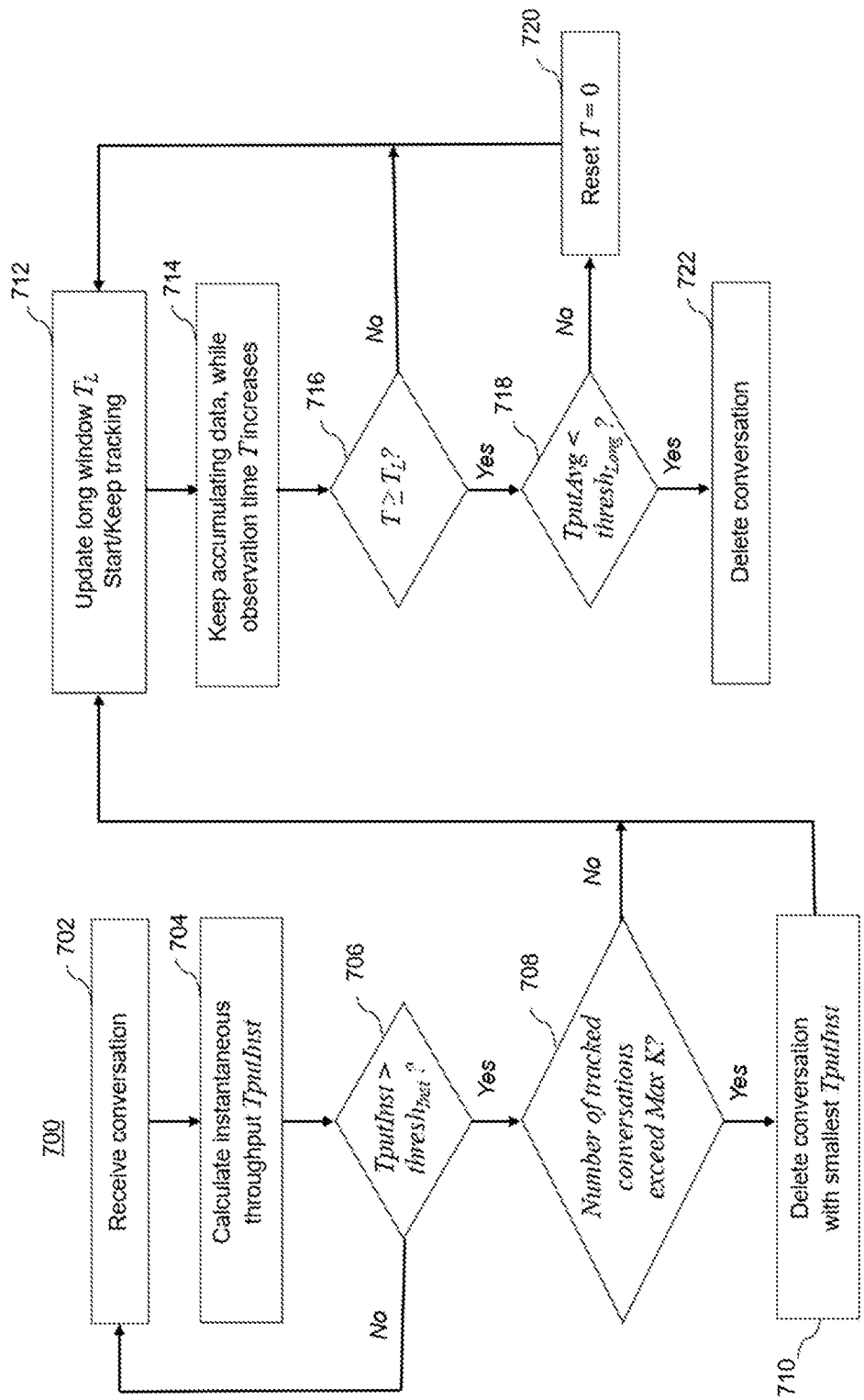
FIG. 7 shows an example of a flow diagram of a throughput-based traffic filtering process in accordance with an embodiment.

FIG. 7 shows an example flow diagram depicting a throughput-based traffic filtering process 700 for network service detection, in accordance with some embodiments. The process 700 may track a new conversation or filter out the conversation. In operation 702, a new conversation may be received, for example, in operation 606 in FIG. 6A.

In some embodiments, two throughput metrics for a conversation may be defined, an instantaneous throughput TputInst and a long-term average throughput TputAvg. An instantaneous throughput may be calculated for a short and predetermined time window. A long-term average throughput may be calculated for a long window, which may be a multiple of the short time window.

In some embodiments, the instantaneous throughput TputInst may be defined as:

$$TputInst = \frac{Tbyte_S}{T_S} \quad (1)$$

Where $T_S$ represents the length of the short observation window, and $Tbyte_S$ represents the total number of transceived bytes for the conversation within the $T_S$ observation window.

For example, in operation 704, the instantaneous throughput TputInst for the conversation may be calculated, for example, using formula (1) above, where $T_S$ is a predetermined short observation time window.

In some embodiments, criteria may be defined to determine when to start tracking a conversation. For example, tracking may start when the TputInst of that conversation is detected to cross a threshold $thresh_{Inst}$. For example, when TputInst is greater than, N bytes per second, where N is the threshold $thresh_{Inst}$ and is an integer greater than 0.

In operation 706, if the instantaneous throughput TputInst has not crossed a predetermined threshold, the process 700 may determine not to track the conversation and go back to operation 702 to receive another new conversation.

When the TputInst of the conversation is detected to cross the threshold, the process 700 may proceed to operation 708. For example, the process 700 may proceed to operation 708 to track the conversation only when the TputInst of the conversation is detected to be greater than N bytes per second, where N is an integer greater than 0.

In operation 708, in some embodiments, the process 700 may determine whether the number of currently tracked conversations (e.g., including this new conversation) exceeds a predetermined number K of conversations. In operation 710, if the number of currently tracked conversations (e.g., including this new conversation) exceeds K, the process 700 may delete a conversation with the current smallest TputInst, for example, deleting from the tracking traffic map.

If in operation 708 the process 700 may determine that the number of currently tracked conversations (e.g., including this new conversation) does not exceed the predetermined number K of conversations, it may proceed to operation 712 where it may update the long-term observation time $T_L$.

In some embodiments, the length of a long-term observation window may be determined using equations (2) and (3) below. The long observation window length $T_L$ may be defined to be a multiple of the short observation window $T_S$. For example:

$$T_L = M * T_S \quad (2)$$

In some embodiments, M may be a function of the instantaneous throughput TputInst. As such, M may be denoted as:

$$M = f(TputInst) \quad (3)$$

Where M may be positively correlated with the value of TputInst. For example, M=floor($R_1$*TputInst+$R_2$), where $R_1$ and $R_2$ are greater than 0 and may represent two linear coefficients defining a relationship between M and TputInst.

In some embodiments, the long-term average throughput TputAvg may be defined as:

$$TputAvg = \frac{Tbytes_L}{T_L} \quad (4)$$

Where $Tbytes_L$ represents the total number of transceived bytes for the conversation within the $T_L$ long observation window.

Figure 8:
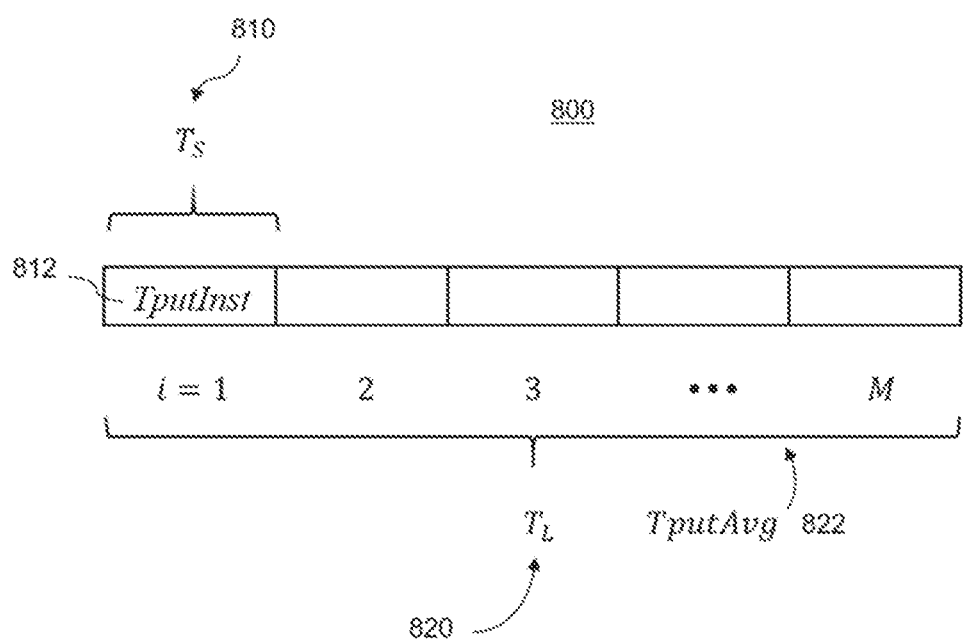
FIG. 8 shows an exemplary relationship between the short and long observation windows in accordance with an embodiment.

FIG. 8 describes an exemplary relationship 800 between $T_L$ and $T_S$.

In operation 712, after updating the long observation window length $T_L$, the process 700 may start, or continue, to track traffic data on the conversation(s).

In operation 714, the process 700 continues tracking traffic data on the conversation(s), as observation (or tracking) time T progresses.

In operation 716, while it is determined that observation time T has not exceeded the long-term observation time $T_L$, the process 700 may proceed back to operation 712 where it may update the long-term observation time $T_L$ as discussed above.

When it is determined that observation time T has exceeded the long-term observation time $T_L$, in operation 718, the process 700 may determine whether the calculated long-term average throughput TputAvg has dropped below a predetermined threshold $thresh_{Long}$.

If the long-term average throughput TputAvg is still greater than the threshold $thresh_{Long}$, in operation 720, the running observation time T may be reset (e.g., to 0). The process 700 may then proceed back to operation 712. In some embodiments, T may be reset to restart accumulating traffic statistics for decision making. This may then provide the latest traffic statistics.

In some embodiments, conversations that have throughput below a predetermined throughput threshold may be removed from the traffic map. For example, when TputAvg is less than N1 bytes per second where N1 is an integer greater than 0. As shown in operation 718, if the long-term average throughput TputAvg is (or has dropped) below a threshold $thresh_{Long}$, then in operation 722, the conversation may be removed from the tracking traffic map.

In some implementations, throughput-based traffic tracking mechanism may be especially useful for bursty traffic such as video streaming, where a burst of data may be periodically sent from the server to the client.

FIG. 8 shows an exemplary relationship 800 between $T_L$ and $T_S$, TputAvg and TputInst. As shown, the long observation window length $T_L$ 820 is a multiple (M) of the short observation window $T_S$ 810. Each short observation window 810 has a corresponding calculated instantaneous throughput TputInst 812, calculated using formula (1) above. The long-term average throughput TputAvg 822 is then calculated using formula (4) above.

In some embodiments, the value of M in equation (3) may be dynamically updated based on the maximum value of TputInst observed in the subsequent short observation windows. If a larger value of TputInst is detected in an observation window i before the last short observation window M, then the value of M may be updated based on this larger TputInst value using equation (4), and then the $T_L$ may be updated using the new value of M and equation (2).

Figure 9:
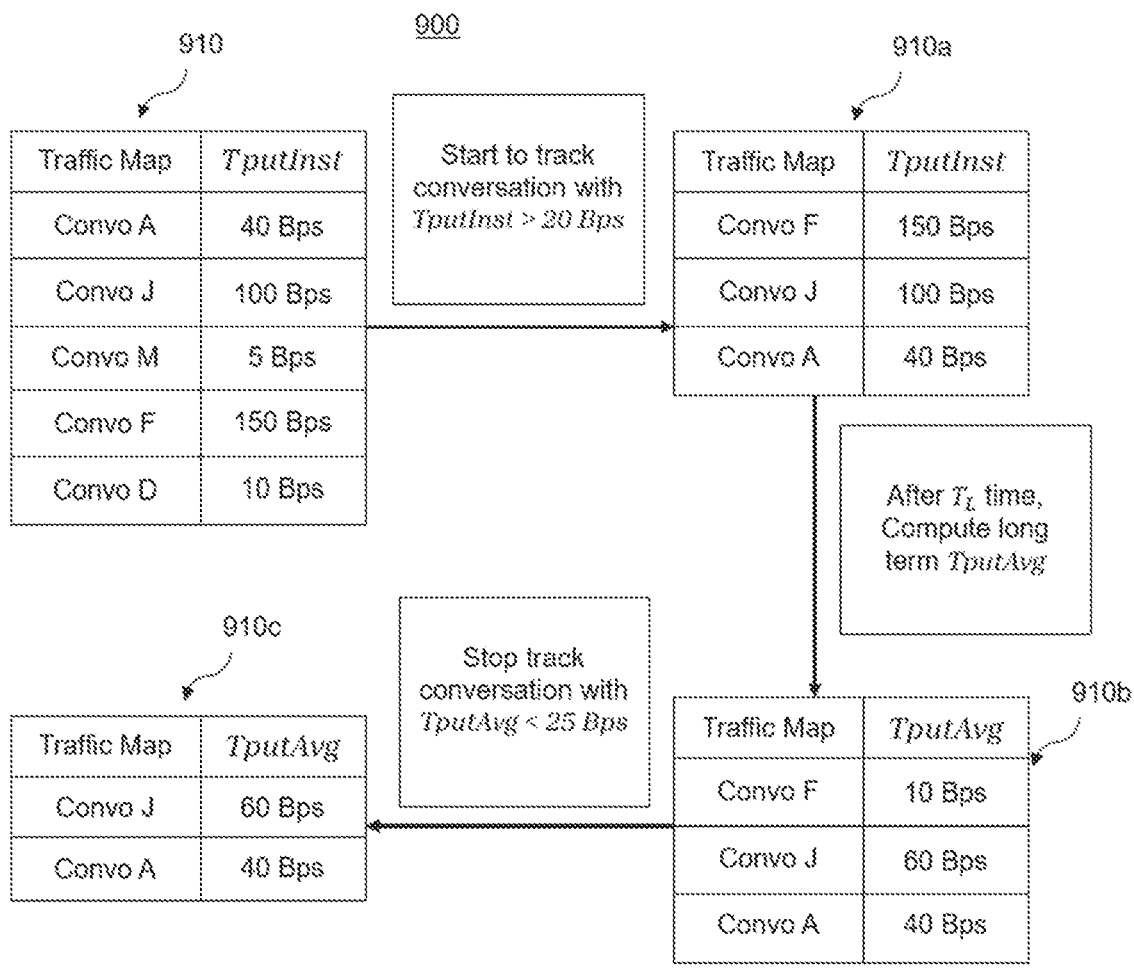
FIG. 9 shows a diagram of an exemplary throughput-based traffic filtering with resulting traffic maps in accordance with an embodiment.

FIG. 9 shows a diagram 900 depicting an exemplary throughput-based traffic filtering with resulting traffic maps. For example, a traffic map 910 may at a point in time have conversations Convo A, J, M F and D with corresponding calculated TputInst 40 Bps, 100 Bps, 5 Bps, 150 Bps and 10 Bps respectively. A traffic filtering process may determine to track only conversations crossing the threshold of 20 Bps, i.e., TputInst greater than 20 Bps. This filtering results in traffic map 910a, having only sorted conversations Convo F, J and A with corresponding calculated TputInst 150 Bps, 100 Bps, and 40 Bps. These conversations are now further tracked for their throughput. After time interval $T_L$, the long-term average throughputs TputAvg for each conversation are calculated and stored in the traffic map, now depicted as traffic map 910b. The traffic filtering process may determine to remove, or stop tracking, conversation with the long-term average throughput TputAvg dropping below a threshold $thresh_{Long}$. In this example, conversations with long-term average throughput TputAvg dropping below 25 Bps may be removed, resulting in traffic map 910c.

Figure 10:
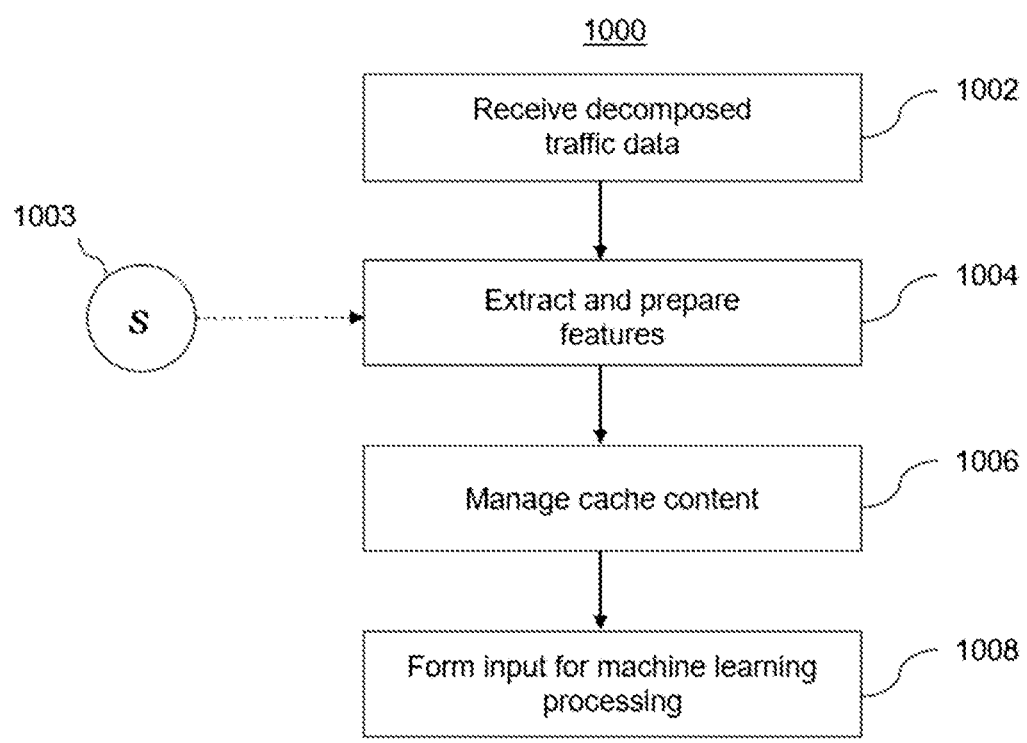
FIG. 10 shows an example of a flow diagram of an input processing process in accordance with an embodiment.

FIG. 10 shows an example of an input processing process 1000 for network service detection, in accordance with some embodiments. Returning briefly to FIG. 5A, after operation 504 where the network traffic stream has been decomposed to produce multiple and smaller traffic flows, the process 1000 discloses further details for the operation 506 as shown in FIG. 5A. The input processing process 1000 may process the features extracted from the traffic decomposing process and prepare the features in the appropriate form for the next system's component.

In operation 1002, the process 1000 may receive the input data, for example, from a traffic data decomposing process or unit. In some embodiments, the process 1000 may receive data 657 from a traffic filter module or unit 656 as shown in FIG. 6E.

In operation 1004, in some embodiments, the process 1000 may extract features from the input data and fuse the features from the input data with the additional sensors' information 1003. The additional sensor information 1003 may be optional since not all device types have all the sensors. Additional sensor information may include the following, but not limited to:

Running applications list: ID of running applications (multiple values; one value for each application).

Application power consumption: running application power consumption value (multiple values; one value for each application that is running).

Touch screen interaction: The user's touch screen interaction counts during a burst (one value).

Camera usage: A value to indicate whether the camera is being used (one value; for example, 1=the camera being used, 0=the camera is not being used).

Speaker usage: A value to indicate whether the speaker is being used (one value; for example, 1=the speaker being used, 0=the speaker is not being used).

Microphone usage: A value to indicate whether the microphone is being used (one value; for example, 1=the microphone being used, 0=the microphone is not being used).

In some implementations, the additional sensor information may be used to boost performance of the service type detection. For example, in the scenario where the user is having a video call (real-time service), it is likely that the microphone, the speaker, and/or the camera are enabled on the device. This information may be very helpful to separate real-time service and non-real-time service.

In some embodiments, the fused features ($x_t$) may be defined as follows:

$$x_t = F(f_t, s_t)$$

where $f_t$ is the traffic features, $s_t$ is the additional sensor features, and F( ) is the fused operation.

Figure 11:
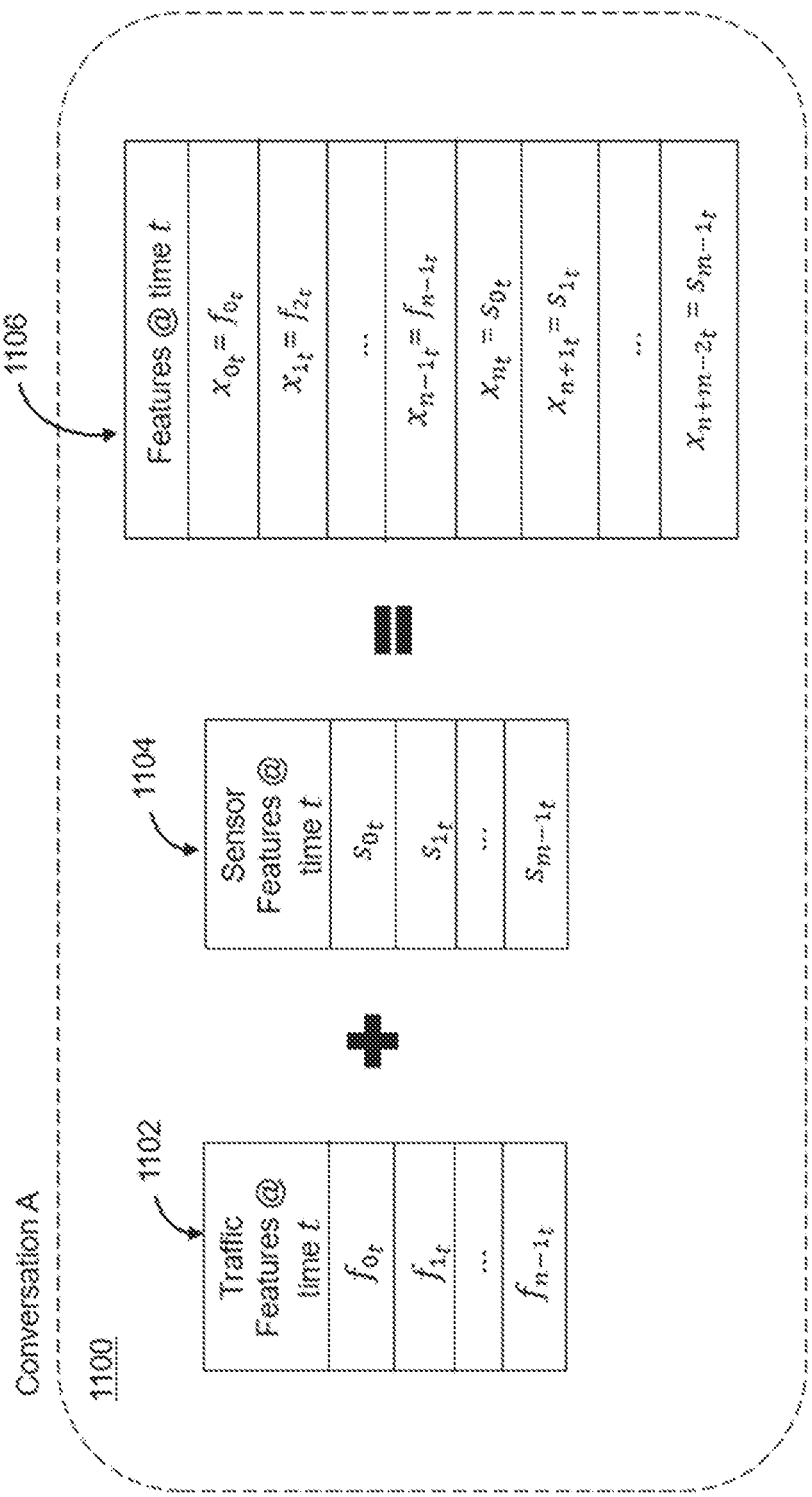
FIG. 11 shows an example of a buffer array concatenation operation in accordance with an embodiment.
Figure 12:
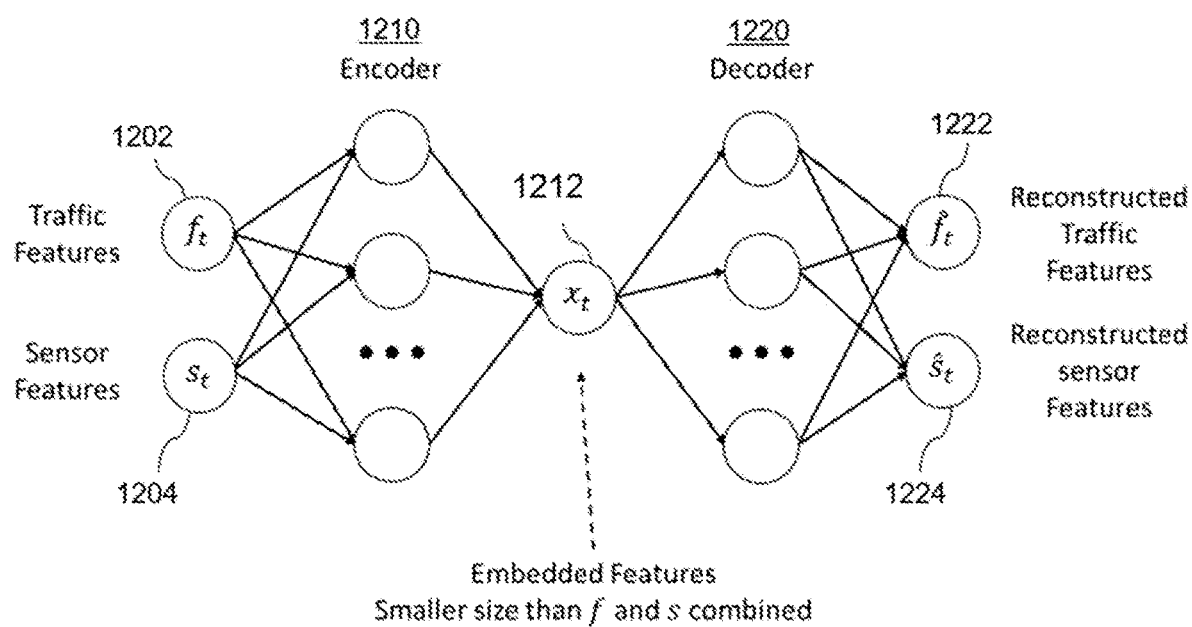
FIG. 12 shows an example of an autoencoder and decoder usage in accordance with an embodiment.

FIG. 11 and FIG. 12 provide further details of the operation F( ) to produce the fused features.

Back to FIG. 10, the process 1000 may feed the prepared features (e.g., fused features $x_t$) from operation 1004 to operation 1006.

In operation 1006, the process 1000 may store and manage the conversations and their corresponding features in a cache, for example, a Least Recently Used (LRU) cache. The LRU cache may aggregate the data for the correspondent conversation that it is holding.

In some embodiments, the LRU cache may be an ordered hash map. Each entry in the LRU cache has a key (e.g., the conversation) and may be linked to the value that holds the features for each time-step. The features for each time-step may be stored in a first-in-first-out buffer. The buffer may have a capacity of n elements. In some implementations, n may have a default value of 6. But other default values may also be considered.

In some embodiments, the fused operation F( ) may be a simple array concatenation operation illustrated in FIG. 11. For example, conversation 1100 may include n traffic features (0 to n−1) captured at time t. These traffic features are shown in array 1102, having traffic feature elements $f_{0t}$ to $f_{n-1t}$. Array 1104 shows m exemplary sensor information (or features) $s_{0t}$ to $s_{m-1t}$ captured at corresponding time t. In some embodiments, the fused operation 1000 may concatenate the traffic feature elements $f_{0t}$ to $f_{n-1t}$ in array 1102 with the sensor information $s_{0t}$ to $s_{m-1t}$ in array 1104. Array 1106 shows the concatenated array resulted from the concatenation operation, including the fused features (xx) elements.

In some embodiments, the process 1000 may include the use of a neural network to extract the embedded features from the traffic features $f_t$ and the sensor features $s_t$. In some embodiments, a neural network autoencoder may be used.

FIG. 12 shows an example autoencoder 1210 being used to produce the fused features. Traffic features $f_t$ 1202 and sensor features $s_t$ 1204 may be fed to the autoencoder 1210. The autoencoder 1210 may use an encoding function to transform the traffic features $f_t$ 1202 and sensor features $s_t$ 1204 into the fused features $x_t$ 1212. In some embodiments, the fused features $x_t$ 1212 may have a smaller size than the combination of the traffic features $f_t$ 1202 and sensor features $s_t$ 1204.

It should be noted that this approach requires the training of the model for the autoencoder. In some embodiments, existing data may be used to train the autoencoder. Training the autoencoder does not require any label besides the input itself since the goal of the training is to encode and reconstruct the input. For example, during training, the fused features $x_t$ 1212 may be reconstructed into traffic features $\tilde{f}_t$ 1222 and sensor features $\tilde{s}_t$ 1224. The training process may thus produce an efficient model for the autoencoder.

Figure 13:
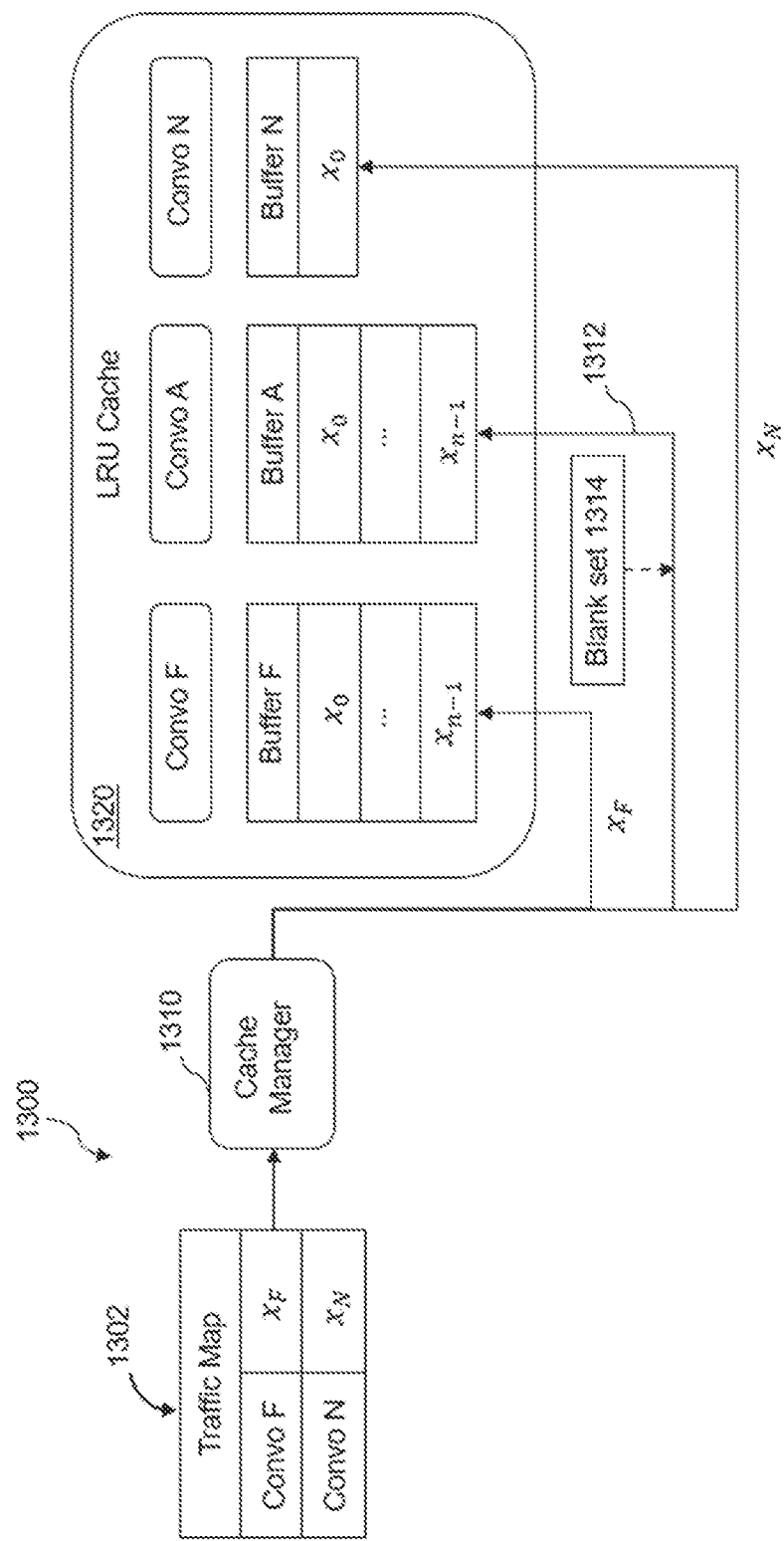
FIG. 13 shows an example of a caching operation in accordance with an embodiment.

FIG. 13 shows an example of caching operation 1300 for operation 1006, in accordance with some embodiments. In this example, a traffic map 1302 is received, for example, from operation 1004. In some embodiments, when there is data for a conversation (e.g., features $x_F$ for conversation F, features $x_N$ for conversation N), the process 1300 may route the data to the corresponding buffer in the LRU cache 1320. In some embodiments, a cache manager 1310 may operate to perform process 1300.

In some embodiments, when an entry associated with a conversation is currently in the cache 1320 and there is no data coming in for it in the traffic map, the cache manager 1310 may insert a blank set of features to its buffer. For example, conversation A is currently in the LRU cache 1320, but there is no data coming in for it in the traffic map 1302. In operation 1312, the cache manager 1310 may insert a blank set of features 1314 to its buffer.

In some embodiments, when the number of blank-feature sets in a buffer reaches the capacity of the buffer (i.e., the buffer now has only blank sets), then the cache manager may signal the LRU cache 1320 to evict that entry.

In some embodiments, the LRU cache 1320 may also reorder its entries based on how recently the entries are used. For example, the most recently accessed may be put at the head and the least recently accessed entry at the tail. In the case that the LRU cache has reached its storage limit and there is new entry to add to the cache, the least recently accessed entry may be evicted (popped) out to get space for the new entry. As an example, given the LRU capacity is 7 (an exemplary number) and all 7 slots are occupied, then when a new entry is introduced, the oldest entry in the LRU cache may be evicted to make space for the new entry.

Figure 14:
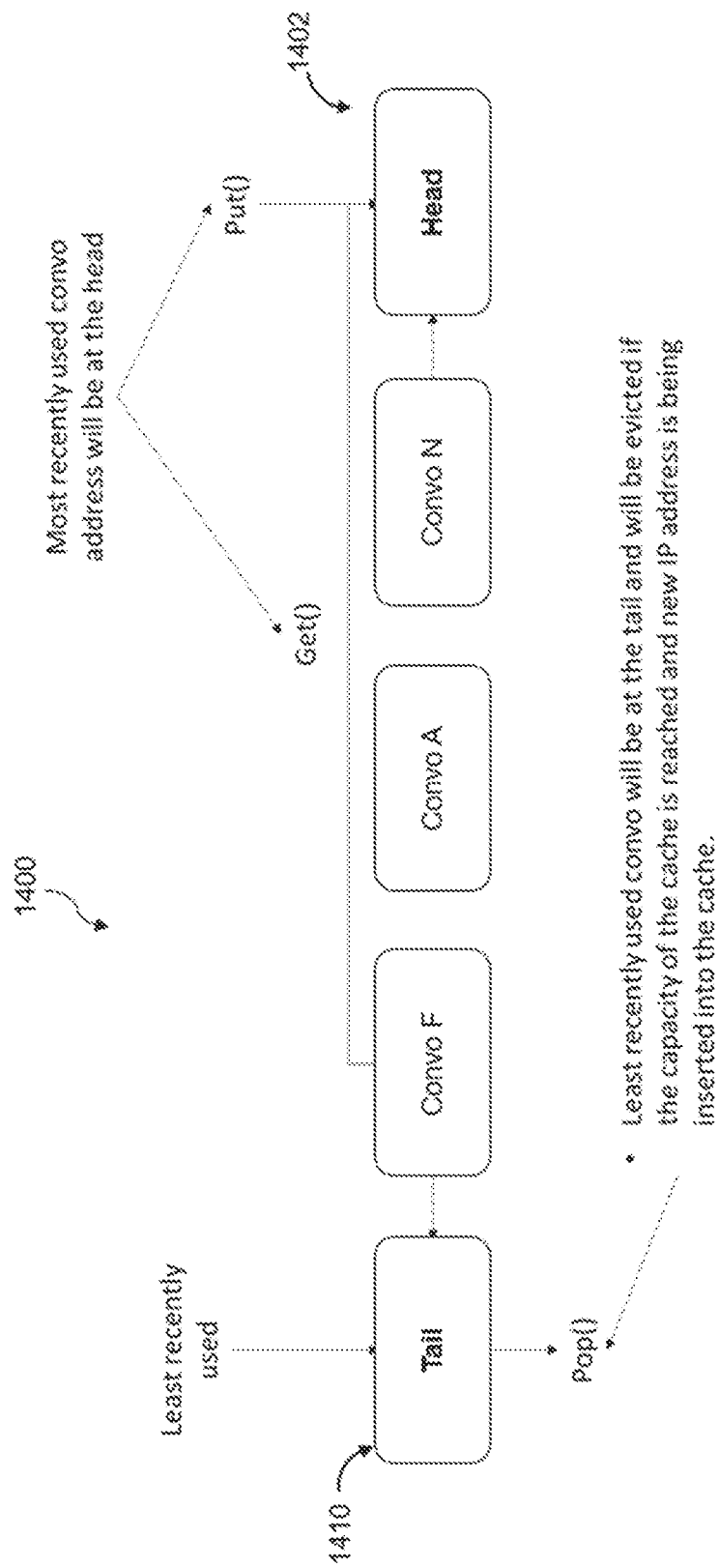
FIG. 14 shows an example of a cache reorder operation in accordance with an embodiment.

FIG. 14 shows an example of a diagram depicting a re-order operation 1400 of an LRU cache, in accordance with some embodiments. For example, if conversion N is the most recently accessed, it may be put at the head 1402. If conversion F is the least recently accessed, it may be put at the tail 1410. In some implementations, the cache may use Get( ) and Put( ) functions to perform the reorder. If the LRU cache has reached its limit and there is new entry to add to the cache, the conversion F, which is at the tail 1410 may be evicted. In some implementations, the cache may use the Pop( ) function to perform the eviction.

Figure 15:
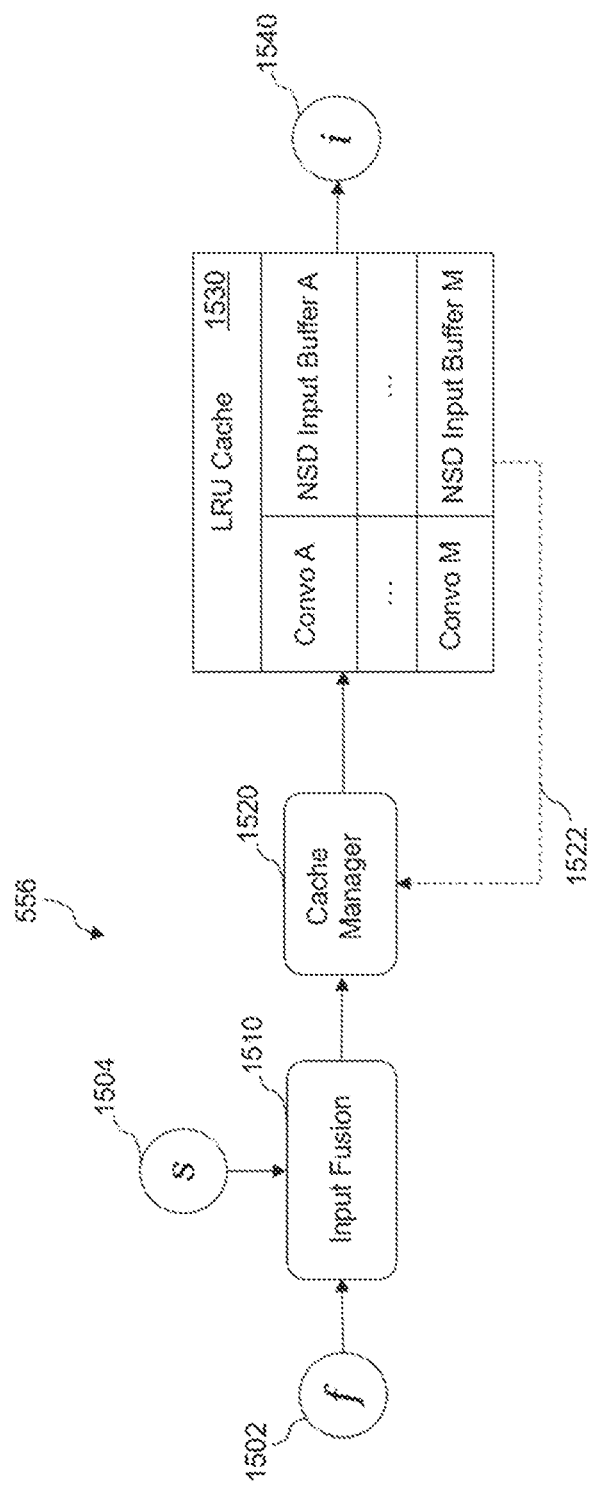
FIG. 15 shows an example of an input processing system in accordance with an embodiment.

FIG. 15 shows an example of a high-level diagram depicting an input processing module or unit (or input processing unit for brevity) 556 for network service detection, in accordance with some embodiments. FIG. 15 discloses further details for the input processing unit 556 as shown in FIGS. 5B and 5C. In some embodiments, the input processing unit 556 may perform the process 1000 described in FIG. 10.

In some embodiments, an input fusion module or unit 1510 may receive traffic features 1502 and sensor features 1504 and perform the operations 1004 as described in FIG. 10 to FIG. 12, fusing traffic features and additional sensor features. A cache manager module or unit (or may be used herein as cache manager for brevity and as shown in the FIG. 1520 may receive a traffic map from the input fusion module or unit 1510. The cache manager module or unit 1520 may perform the operations of the cache manager 1310 described above, and manage an LRU cache 1530. As described above, through operation 1522, the cache manager module or unit 1520 may include, for example, evicting out-of-date conversation and re-ordering of the LRU cache 1530.

In some embodiments, the content of the LRU cache may be fed as input 1540 into a machine learning (ML) based network service detection module or unit, for example, an ML-based service detection module or unit 558 as shown in FIG. 5B. For example, the input to the ML model of each conversation may be its buffer in the LRU cache. As described in further detail below, a buffer size check operation (see 1708 in FIG. 17) may be performed by the input processor 1500 on the buffer stored in the LRU cache. Only entries that pass the buffer check may be fed as input into the ML-based service detection module or unit 558.

Figure 16:
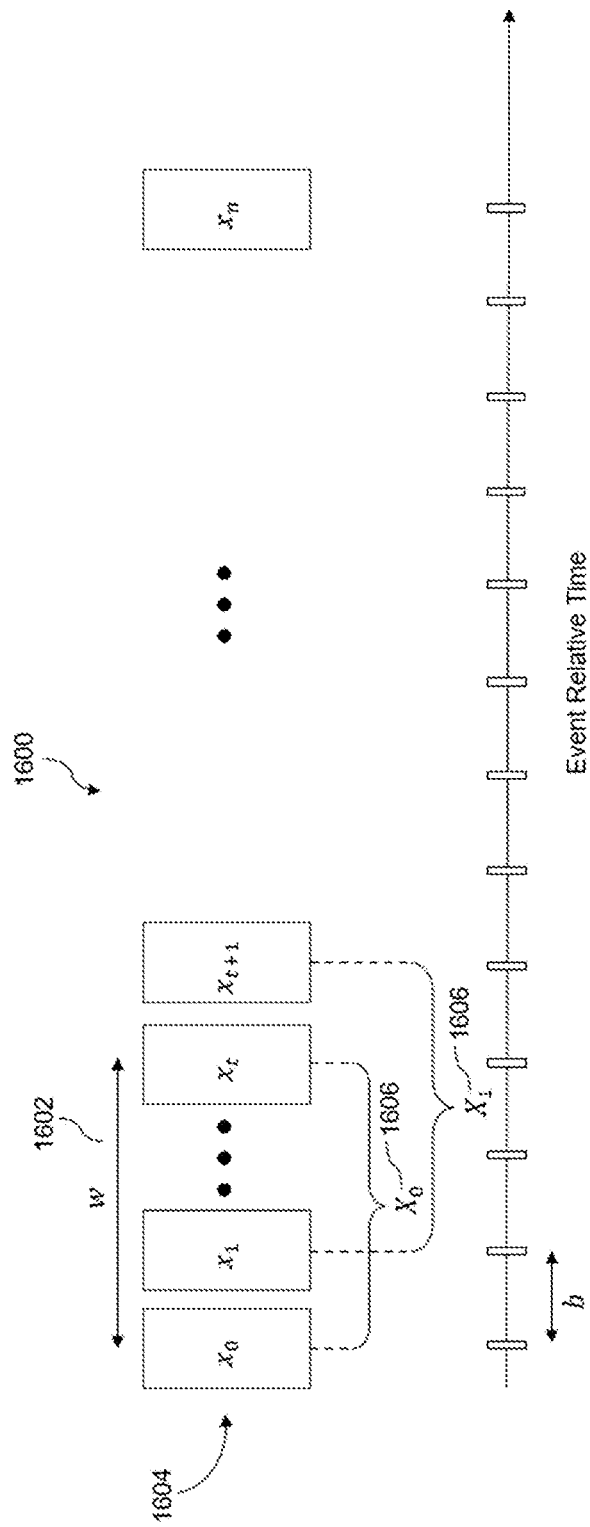
FIG. 16 shows an example of input formation for an ML model in accordance with an embodiment.

FIG. 16 shows an example of a diagram 1600 depicting forming of an input to the ML model, in accordance with some embodiments. As shown in FIG. 16, in some embodiments, the process 1600 to form the input to the ML model for each conversation may include sliding a time window 1602, for example, of size w, over a series of features 1604 of that conversation. For example, at time t, the input $X_t$ 1604 may include a combination of multiple feature vectors, e.g., $[x_{t-w+1}, \ldots, x_t]$. In some implementations, w may have a default value of 6. In an example, a sequence of 3 seconds (3000 ms) may be used where each time step (or burst b as shown) is 500 ms.

$$\frac{3000 \text{ ms}}{500 \text{ ms}} = 6.$$

In some implementations, the Thus, a total number of time steps for each input is buffer size may have the same number of entries, e.g., 6 in this example. Therefore, the input $X_t$ at time t may be, or may include, the following feature vectors $[x_{t-5}, x_{t-4}, x_{t-3}, x_{t-2}, x_{t-1}, x_t]$.

In some embodiments, to improve the performance of the ML-based service detection module or unit, service types may be pre-defined. In some examples, traffic or applications in the same service may need to have similar requirements (such as latency requirement) so that the classification is meaningful. In other examples, the traffic or applications assigned to the same service type may need to have clear common signature, so that the detection accuracy may be sufficiently high.

In some embodiments, three (3) service types may be defined. These may include, for example, cloud gaming (CG) service, real-time (RT) service, and non-real-time (NRT) service. Although 3 service types are being described, the number of service types is not limited to 3 and may be less than or more than 3.

Cloud gaming applications (e.g., Xbox Cloud Gaming) generally may have very high and consistent downlink activities. Interactions between the uplink and downlink activities for these cloud gaming applications may also be high. This information may advantageously be used to identify cloud gaming category.

Real-time applications may include services with video call and audio call (e.g., WhatsApp, Zoom, Viber), and high interaction mobile games (e.g., PUBG) will fall in this category. Likewise, this may advantageously be used to identify real-time category.

The non-real-time category may include services that may not require real-time interaction. Examples of non-real-time applications may include, for example, video-streaming (e.g., Netflix, Disney+), audio streaming (e.g., Pandora and Spotify), web-browsing, file-downloading (DL), file-uploading (UL), etc.

In some embodiments, when a buffer of a conversation in the LRU cache may be fed as input to the ML model, the size of the buffer may be checked.

Figure 17:
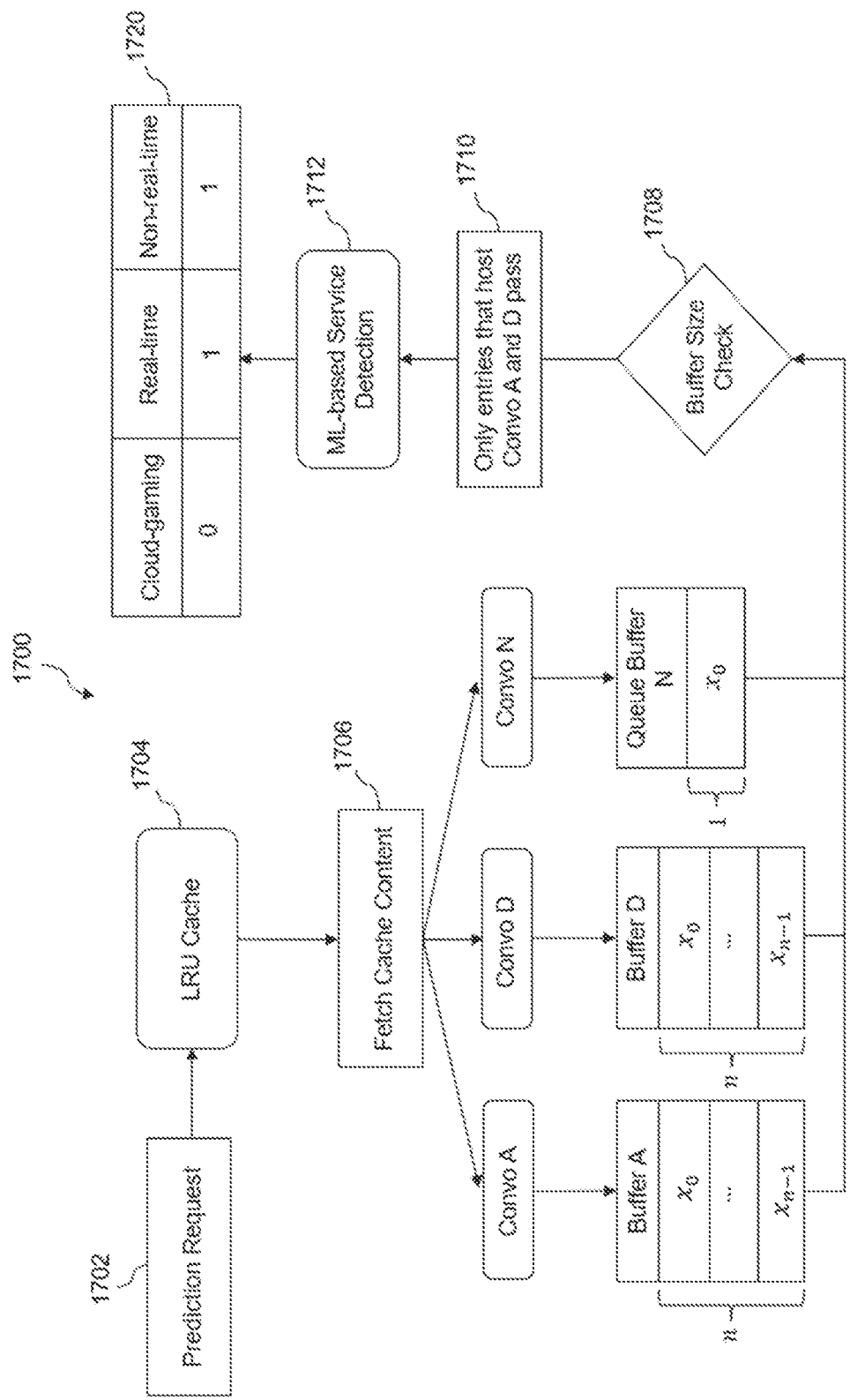
FIG. 17 shows an example of input and output of the ML model in accordance with an embodiment.

FIG. 17 shows an example of a diagram 1700 depicting exemplary input and output of the ML model, in accordance with some embodiments. As shown in FIG. 17, in some embodiments, in operation 1702, a request for service type predictions may be received. In some examples, an event listener process may receive the request. In operation 1706, content from the LRU cache 1704 may be received (or fetched). In some embodiments, all entries (or content) in the LRU may be fetched. The example in FIG. 17 shows the received content of the LRU cache includes three conversations A, D and N, and their corresponding buffers A, D and N. In this example, Convo A may include real-time traffic, Convo D may include non-real-time traffic and Convo N may include cloud-gaming traffic. In operation 1708, the size of each of the buffer A, D and N may be checked. For example, each buffer may be checked whether it has reached its capacity. In the example of FIG. 17, the buffer capacity is n entries, where n is a positive integer. As shown, buffer A and D both reach their capacity of n buffer entries. Buffer N has only 1 entry, thus has not reached its capacity. In some embodiments, in operation 1710, only entries for conversations A and D passed the buffer size check (satisfy the size requirement) are passed to the network service detection module or unit 1712, which is an ML-based service detection in this example. Buffers that are not at capacity may need more time to fill up the buffers. In some examples, these buffers may hold low-volume traffic and may not require to be detected for service types.

In this example, two (2) conversation entries pass the buffer-size check 1708 and are fed to the ML-based network service detection module or unit 1712, there are two (2) corresponding output service type predictions 1720 (one for each inputted conversation), shown as one (1) real-time service type and one (1) non-real-time service type.

In some embodiments, the ML-based service detection module or unit 1712 may have only one classifier (e.g., only a coarse-grained classifier). In some embodiments, the ML-based service detection module or unit 1712 may have multiple layers of classifiers (e.g., a coarse-grained classifier plus several fine-grained classifiers).

Using multiple layers of classifiers may maximize the gain from the classifiers, and increase the effectiveness of the classification. For example, an ML-based service detection module or unit 1712 may have two layers. The first layer (L1, e.g., the coarse-grained classifier) may achieve a rough range of the requirements with strong signature (statistics that characterize the data), i.e., the network traffic belongs to each of the service types in the L1 layer may have highly distinguishable characteristics from each other. For example, in the real-time service type, uplink and downlink traffic may have more activities compared to traffic from the non-real-time service type. From then, the second layer (L2, e.g., the fine-grained classifiers) which may include multiple sub-classifiers may perform fine grain classifying on the results from the L1 layer. The service types in the second layer (L2) may have less obvious traffic characteristics that can be used to distinguish from one category to another. The use of multiple layers may achieve a finer range of requirements.

Figure 18:
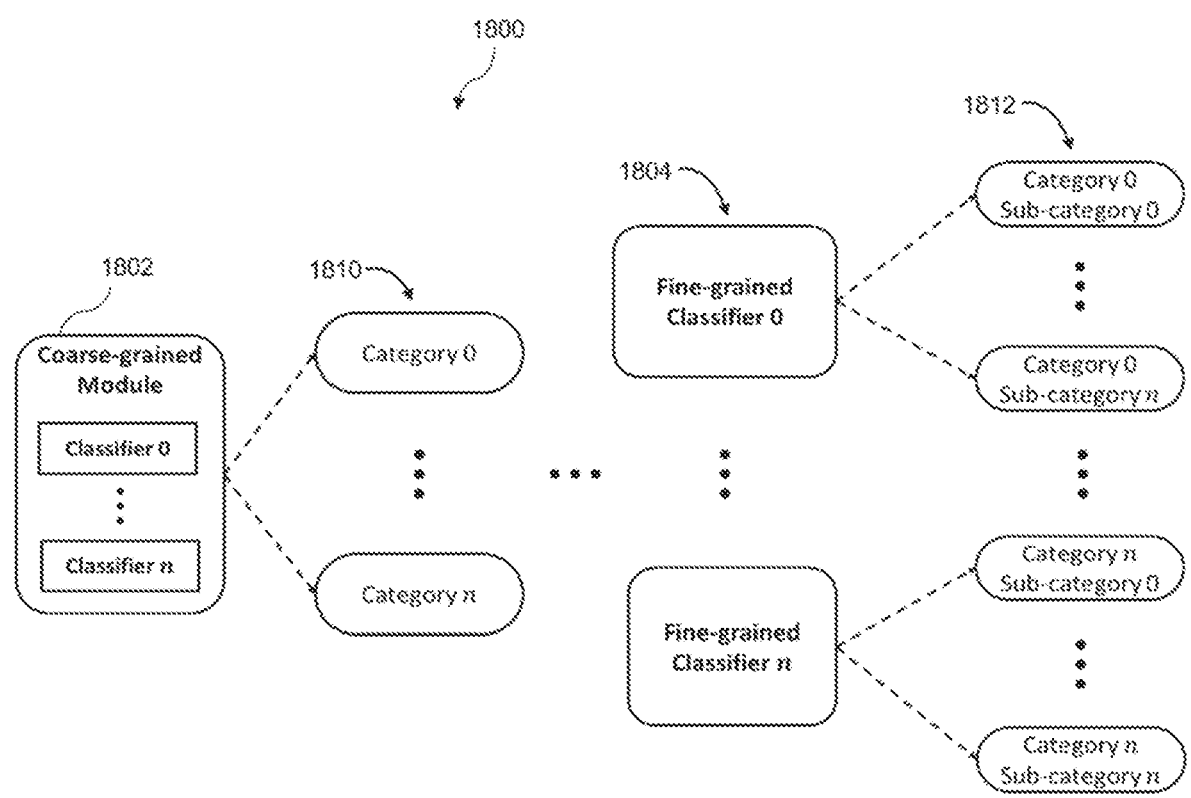
FIG. 18 shows a diagram of an exemplary multi-layer architecture of the ML-based service detection module or unit in accordance with an embodiment.

FIG. 18 shows a diagram depicting an exemplary multi-layer architecture 1800 of the ML-based service detection module or unit, in accordance with some embodiments. As shown in FIG. 18, in some embodiments, the coarse grain classifier 1802 may classify the service types into multiple categories 1810. After the coarse grain classifier 1802 classifies the service types into multiple categories 1810, the fine grain classifiers 1804, which may include multiple sub-classifiers, may perform fine grain classifying on the results from the coarse grain classifier 1802. In some embodiments, the fine grain classifiers 1804 may further divide the categories 1810 into sub-categories 1812. For example, in the example of FIG. 17, a second layer (L2) of the ML-based service detection module or unit may also be implemented, where the real-time service category and the non-real-time service category may be further divided into sub-service categories.

In some embodiments, the classifiers may be implemented using any supervised ML techniques including but not limited to traditional algorithms such as Support Vector Machine (SVM), K-Nearest Neighbor (KNN), Random Forest or state-of-the-art deep learning neural networks.

Figure 19:
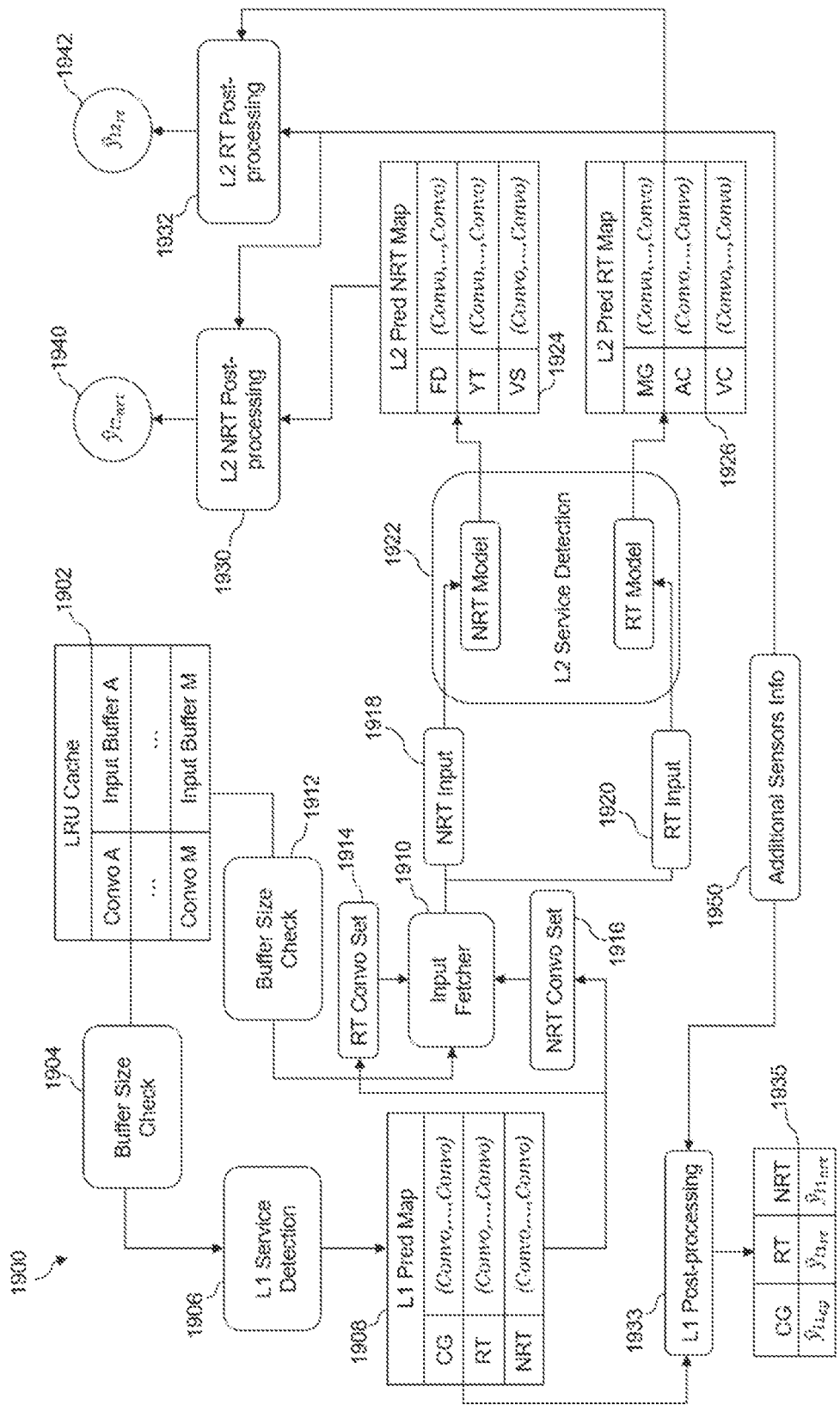
FIG. 19 shows a diagram of an exemplary two-layer architecture of the ML-based service detection module or unit in accordance with an embodiment.

FIG. 19 shows a diagram depicting an exemplary two-layer architecture 1900 of the ML-based service detection module or unit, in accordance with some embodiments. As described above, when a request for predictions is received, conversation content from the LRU cache 1902 may be received. A buffer check operation 1904 may be performed to feed only conversations with buffers at capacity to a first layer (L1) service detection module or unit 1906.

In some embodiments, the L1 service detection module or unit 1906 may produce a first layer (L1) prediction map 1908. For example, the L1 prediction map 1908 may include 3 service types (cloud-gaming (CG), real-time (RT) and non-real-time (NRT)). Each service type may include one or more corresponding conversations. In some embodiments, the L1 prediction results may be organized into a hash map (L1 Pred Map 1908) where each entry in the map may contain the service category as the key and a list of conversations that belong to that category as the value.

In some embodiments, an L1 post-processing module or unit (shown as L1 Post-processing) 1933 may receive the L1 prediction map 1908 and perform a post-processing scheme, described in further detail below, to produce a decision table 1935 (e.g., similar to table 1720 in FIG. 17).

In some embodiments, an input fetcher 1910 may receive the conversations that belong to each category, for example, real time conversation set (shown as RT Convo Set) 1914 and non-real-time conversation set (shown as NRT Convo Set) 1916, from the L1 prediction map 1908. The input fetcher 1910 may also receive current traffic input from the LRU cache 1902 and perform another buffer check 1912. In some embodiments, both L1 (see operation 1904) and a second layer (L2) have their own buffer size checks. In this case, the requirement for the buffer size of L1 and L2 may be different. For example, L1 buffer requirement may have a default capacity of 6, while L2 buffer requirement may have a default capacity of 12. Conversation sets that pass the buffer check 1912 may be fed as input (shown as NRT input 1918 and RT input 1920) to an L2 service detection module or unit 1922.

The L2 service detection module or unit 1922 may then further divide the NRT input 1918 and RT input 1920 into sub-service categories. The L2 service detection module or unit 1922 may produce an L2 map 1924, 1926 for each service type. For example, the NRT L2 map (shown as L2 Pred NRT Map) 1924 may include sub-categories file transfer (file download/upload FD), YouTube (YT) and video streaming (VS) and their corresponding conversations. The RT L2 map (shown as L2 Pred RT Map) 1926 may include sub-categories mobile gaming (MG), audio call (AC) and video call (VC) and their corresponding conversations.

In some embodiments, the sub-service prediction outputs 1924 and 1926 from the L2 service detection module or unit 1922 may be passed to their corresponding L2 post-processing module or unit (e.g., shown as L2 RT Post-processing 1932 and L2 NRT Post-processing 1930). In some embodiments, the L2 post-processing modules or units, as described in further detail below, may be implemented similar to the L1 Post-processing module or unit 1933. At this point, additional sensors information 1950 may also be used in the L2 Post-processing modules or units 1930, 1932 to determine the final sub-service types l2_nrt 1940 and l2_rt 1942.

As shown in FIGS. 5A and 5B, in some embodiments, a post-processing module or unit 560 may receive the predictions from the service detection module or unit 558 and perform operation 510.

In some embodiments, the post-processing module or unit 560 may store the most recent n past multi-label predictions (n may be dynamically determined to work with the specific application) produced by the ML-based service detection module or unit and use this information to generate a decision accordingly. In some embodiments, n may have the default value of 5.

Figure 20:
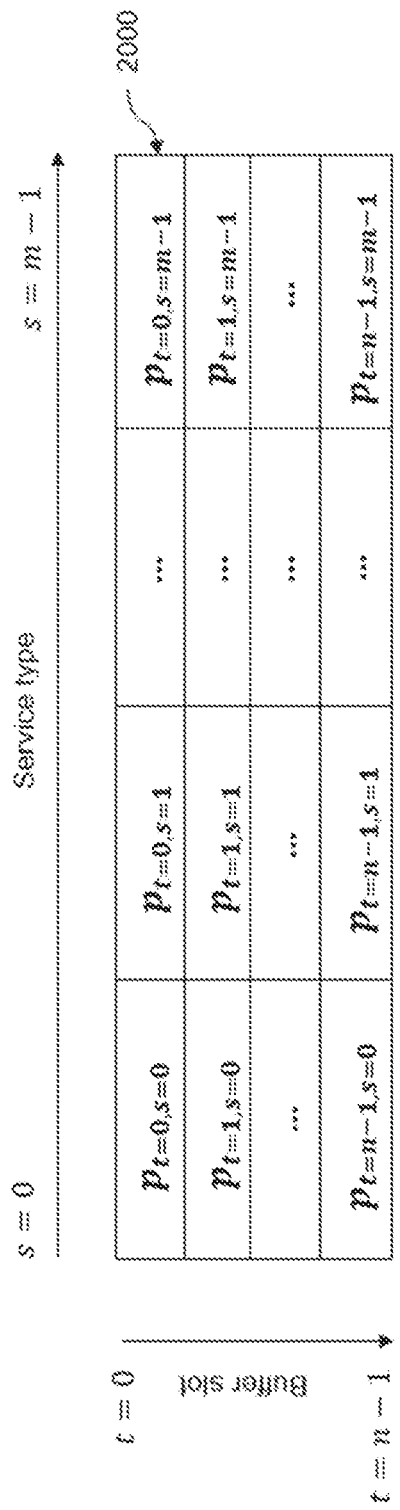
FIG. 20 shows an example prediction table in accordance with an embodiment.

In some embodiments, the post-processing module or unit 560 may organize the predictions from the service detection module or unit 558 into a table, as shown in the exemplary table 2000 in FIG. 20.

As shown in FIG. 20, each column of the table 2000 may be an individual buffer for the corresponding service, where n is the size of the buffer and m is the number of the service types s. In some embodiments, the buffer may be a FIFO, where buffer slot t=0 may have the most recent prediction p.

In some embodiments, the post-processing module or unit 560 may apply different voting schemes to determine the service type in a traffic flow. For example, in some embodiments, the post-processing module or unit 560 may perform a majority voting decision to adopt the class labels which are voted for the most to be the final decision. Generally, in majority voting, the predicted class label for a particular sample is the class label that represents the majority of the class labels predicted by each individual classifier. In some embodiments, the decision as to whether each service is present may be determined as $$d_{s \in [0, m-1]} = \max(\text{count\_zero}(P = (p_{0,s}, \ldots, p_{n-1,s})), \quad (5)$$
$$\text{count\_nonzero}(P = (P_{0,s}, \ldots, P_{n-1,s}))).$$

Where p's are the predictions shown in FIG. 20 above, with 0 meaning not-activated and 1 (non-zero) meaning activated. The Max function is used to figure out whether to activate or not activate. If it is activated then that service may be predicted as present in the traffic. Otherwise, the service may be predicted as not present.

Figure 21:
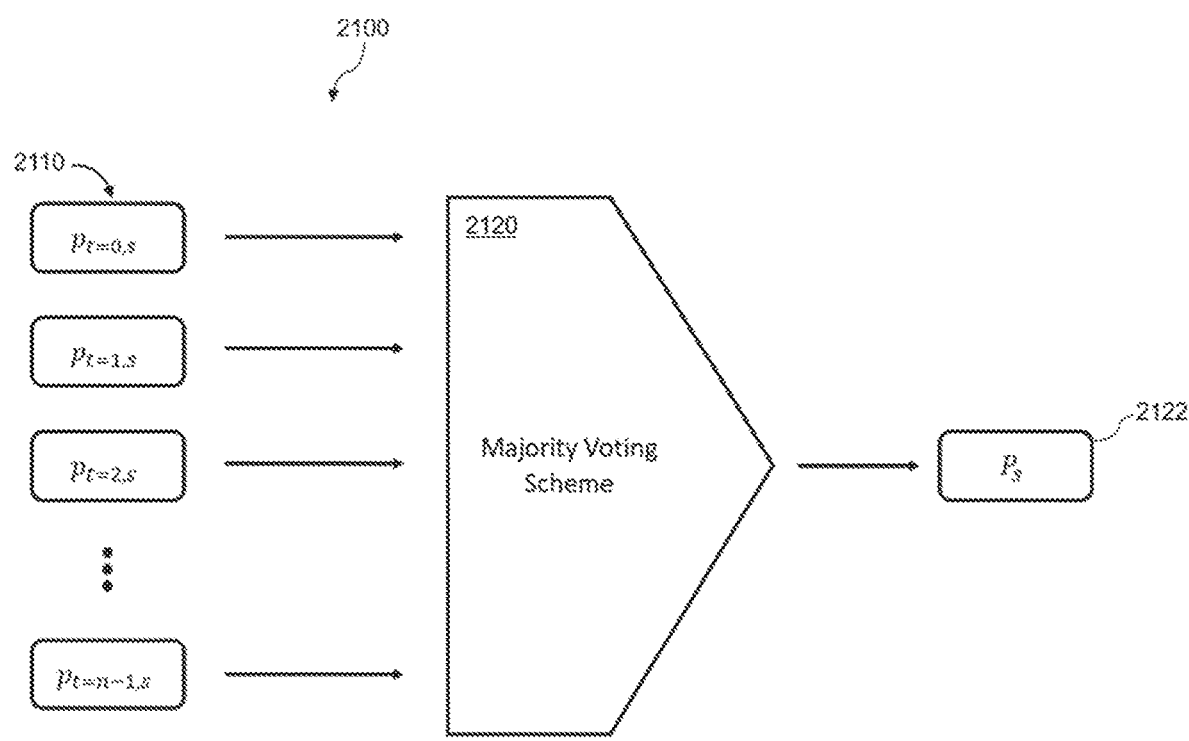
FIG. 21 shows a diagram of an exemplary majority voting scheme in accordance with an embodiment.

FIG. 21 shows a diagram depicting an exemplary voting scheme 2100, in accordance with some embodiments. For example, predictions 2110, such as output 1924 and 1926 (in FIG. 19), may be passed through a majority voting scheme algorithm 2120 (e.g., L2 NRT Post-processing 1930 and L2 RT Post-processing 1932 in FIG. 19). The majority voting scheme algorithm 2120 may apply formula (5) to the predictions 2110. Decision output 2122 from the majority voting scheme algorithm 2120 may be the prediction with the most votes (e.g., NRT decision 1940 and RT decision 1942 in FIG. 19).

In some embodiments, the post-processing module or unit 560 may perform a weighted voting scheme. Unlike the majority voting scheme described above, the weighted voting scheme may give a voting power to each vote or raw prediction. The most recent raw prediction may be given the most voting power up and the following raw predictions at the previous time steps may decay at a rate determined by the hyper-parameter a (which may have default value 0.1). In some embodiments, raw predictions from the farther past may have less voting power compared to the most recent ones.

Figure 22:
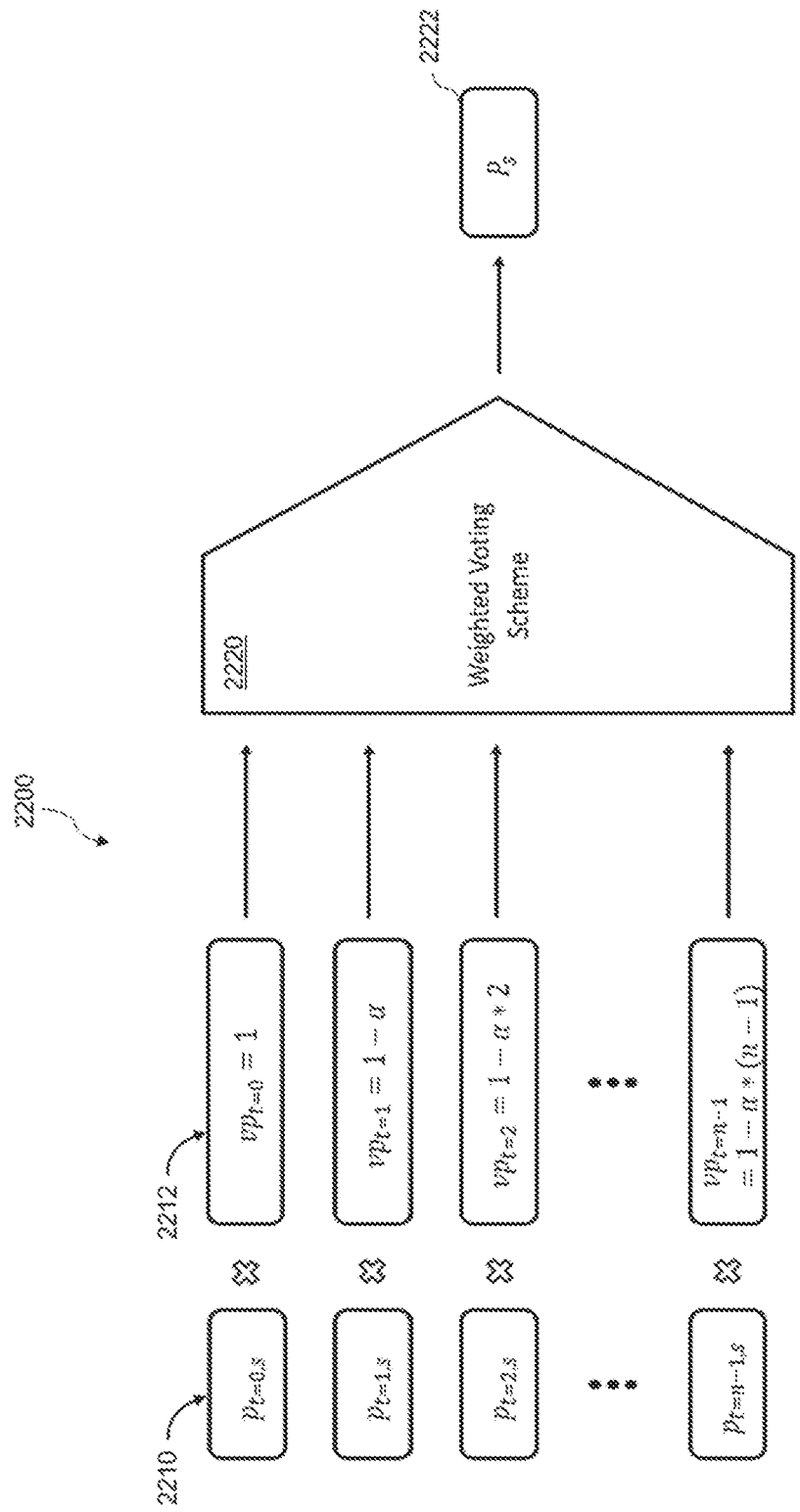
FIG. 22 shows a diagram of an exemplary weighted voting scheme in accordance with an embodiment.

FIG. 22 shows a diagram depicting an exemplary weighted voting scheme 2200, in accordance with some embodiments. For example, predictions 2210, such as output 1924 and 1926 (in FIG. 19), may be passed through a weighted voting scheme algorithm 2220 (e.g., in L2 NRT Post-processing 1930 and L2 RT Post-processing 1932 in FIG. 19). Generally, in weighted voting, each classifier may have a weight attached to its vote. In some embodiments, voting power 2212 may be applied to the predictions 2210, before passing the predictions through the weighted voting scheme 2220. The exemplary formula for the voting power 2212 for each prediction 2210 is shown in FIG. 22. Decision output 2222 from the weighted voting scheme algorithm 2220 may be the prediction with the most votes (e.g., NRT decision 1940 and RT decision 1942 in FIG. 19).

Figure 23:
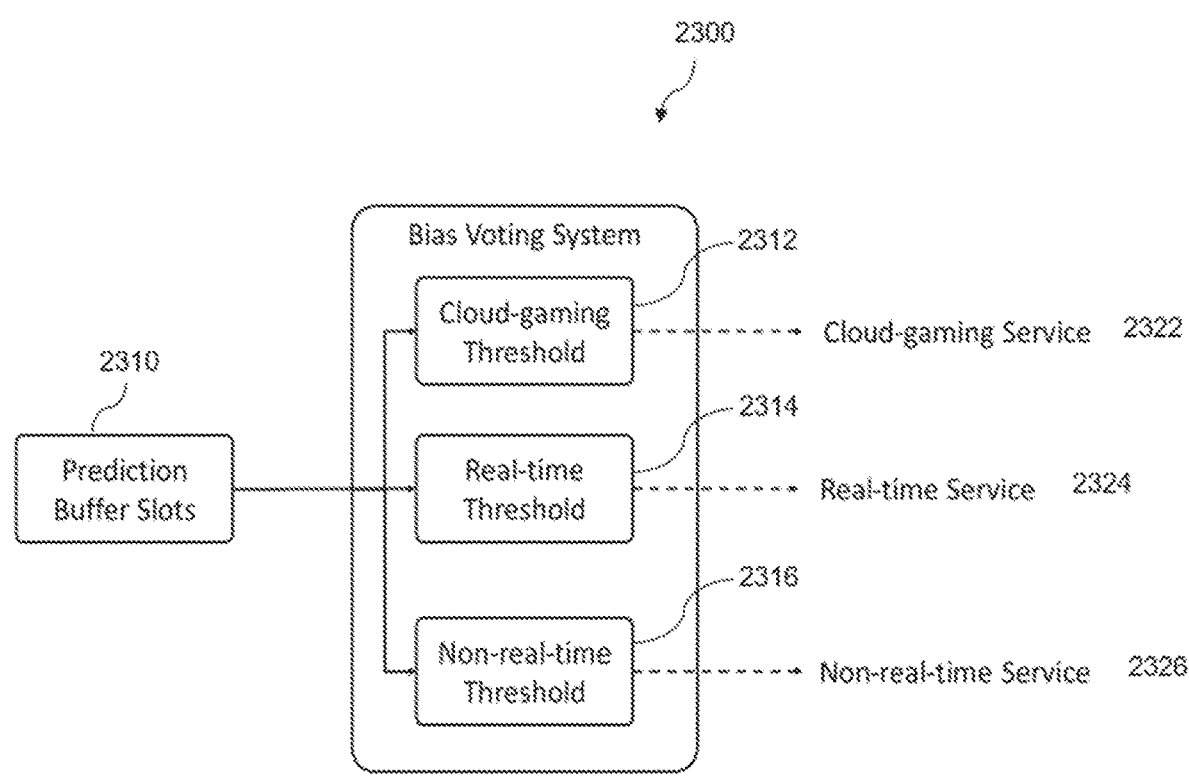
FIG. 23 shows a diagram of an exemplary bias voting scheme in accordance with an embodiment.

In some embodiments, the post-processing module or unit 560 may perform a bias voting scheme. FIG. 23 shows a diagram depicting an exemplary bias voting scheme 2300, in accordance with some embodiments. In this scheme, multiple threshold filters corresponding to the number of the defined service types may be defined. For example, as shown in FIG. 23, three threshold filters 2312-2316 are defined for the three defined service types (cloud gaming, real-time and non-real-time). If the number of detections for a service type in the n buffer slots 2310 (as shown, e.g., in FIG. 20) pass the threshold, then that service type 2322-2326 is predicted to be present in the traffic.

In some embodiments, the decision may start at the most demanding service threshold in term of latency requirement (e.g., cloud gaming services are more demanding than real-time and non-real-time services, as cloud gaming services require smaller latency than the other service types), which may require the lowest threshold (e.g., the least number of detections in the n buffer slots). The decision may continue to pass a multi-stack threshold system until it passes one of the thresholds, which means the decision is that corresponding service type.

In some embodiments, the post-processing module or unit 560 may perform an enhanced bias voting scheme. Generally, the enhanced bias voting scheme may be substantially similar to the bias voting scheme. The difference is that the enhanced bias voting scheme may utilize additional sensor information (sensor information as described previously herein).

Figure 24:
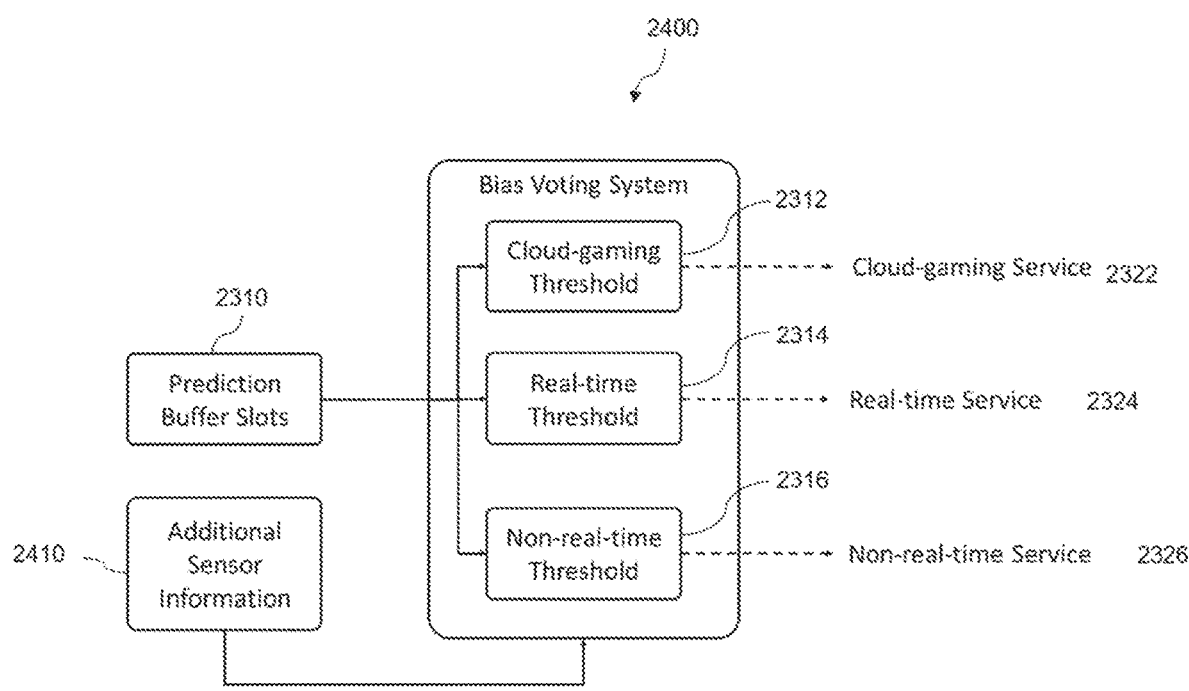
FIG. 24 shows a diagram of an exemplary enhanced bias voting scheme in accordance with an embodiment.

FIG. 24 shows a diagram depicting an exemplary enhanced bias voting scheme 2400, in accordance with some embodiments. For example, while other elements of FIG. 24 are similar to FIG. 23, additional sensor information 2410 may be used. For example, if the camera is enabled and the prediction buffer slots may contain real-time (RT) predictions, then the scheme 2400 may determine that it may be very likely that the user is using VOIP video-call. In this case, another threshold for RT service, which is lower than a default RT threshold (described in the bias voting scheme) may be used. This policy may effectively help detect the RT service faster and easier.

In another example, the current application in focus may be a game, the system may detect this information and provide the information to the post-processing unit 560. In this case, the prediction buffer slot may currently contain cloud-gaming (CG) predictions. Then a lower CG threshold may be used to make the decision whether CG service type is present in the traffic flow or not.

In some embodiments, a machine learning model may be trained to predict the type of service. For example, a list of running applications/packages that generate network traffic may be obtained. The list may include information about the applications/packages, such as their process IDs (PIDs). Other information related to the network traffic is also obtained. This information may include IP addresses, e.g., server IP addresses of active connections. Network analyzer tools may be used to track network system calls to obtain network and connection information. A traffic log may be kept for the active connections. Information from the traffic log may be cross referenced with the server IP addresses collected from the network analyzing tool to identify which data comes from which applications/packages. These obtained data may be used in the training.

As used herein, a reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

As used herein, the term "couple" and its derivatives refer to any direct or indirect communication between two or more elements, whether or not those elements are in physical contact with one another. The terms "transmit," "receive," and "communicate," as well as derivatives thereof, may encompass both direct and indirect communication. The terms "include" and "comprise," as well as derivatives thereof, mean inclusion without limitation. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely.

Various functions described herein may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" may include any type of computer code, including source code, object code, and executable code. The phrase "computer readable medium" may include any type of medium capable of being accessed by a computer, such as read only memory (ROM), random access memory (RAM), a hard disk drive, a compact disc (CD), a digital video disc (DVD), or any other type of memory. A non-transitory computer readable medium may include media where data can be permanently stored and media where data can be stored and later overwritten, such as a rewritable optical disc or an erasable memory device.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A network connected device comprising:
    a transceiver configured to receive network traffic from the network;
    a memory coupled to the transceiver;
    a processor coupled to the memory and the transceiver, the processor configured to:
    decompose the network traffic into one or more data flows based on source information and destination information;
    store the data flows in a traffic map, each entry of the traffic map includes a data flow identification and traffic information of the data flow in an observation time window;
    filter the stored data flows based on traffic throughput in each of the stored data flows;
    calculate a first throughput for the observation time window for each filtered data flow;
    store filtered data flows that have a throughput greater than the first throughput in the traffic map; and
    determine a service type for each of the stored filtered data flows using machine learning.

2. The network connected device of claim 1, wherein the source information is a source Internet Protocol (IP) address or a source port, and the destination information is a destination IP address or a destination port.

3. The network connected device of claim 1, wherein the processor is configured to filter the stored data flows based on a number of packets or a number of bytes in each of the stored data flows.

4. The network connected device of claim 1, wherein the processor is configured to:
based on a determination that the number of stored filtered data flows is greater than a first throughput threshold, remove a stored filtered data flow that has a smallest throughput.

5. The network connected device of claim 4, wherein the processor is configured to:
calculate a second throughput for a second observation time window for each stored filtered data flow, wherein the second observation time window is longer than the observation time window; and
based on a determination that the second throughput of a stored filtered data flow is less than a second throughput threshold, remove the stored data flow from the traffic map.

6. The network connected device of claim 1, wherein the processor is configured to receive information from one or more sensors of the network connected device and filter the stored filtered data flows including the information from the one or more sensors.

7. The network connected device of claim 1, wherein the processor is configured to use a multi-layer machine learning model having a first layer and a second layer, wherein the first layer of the multi-layer machine learning model determines the service type and the second layer of the multi-layer machine learning model further divides the service type into sub-categories.

8. The network connected device of claim 1, wherein the processor is further configured to receive current information from one or more sensors of the network connected device and determine the service type including the current information from the one or more sensors.

9. A method for detecting network service types, the method comprising:
receiving network traffic from a transceiver;
decomposing the network traffic into one or more data flows based on source information and destination information;
storing the data flows in a traffic map in a memory, each entry of the traffic map includes a data flow identification and traffic information of the data flow in an observation time window;
filtering the stored data flows based on traffic throughput in each of the stored data flows;
calculating a first throughput for the observation time window for each filtered data flow;
storing the filtered data flows that have a throughput greater than the first throughput in the traffic map; and
determining a service type for each of the stored filtered data flows using machine learning.

10. The method of claim 9, wherein the source information is a source Internet Protocol (IP) address or a source port, and the destination information is a destination IP address or a destination port.

11. The method of claim 9, wherein the filtering the stored data flows is based on a number of packets or a number of bytes in each of the stored data flows.

12. The method of claim 9, further comprising:
based on a determination that the number of stored filtered data flows is greater than a first throughput threshold, removing a stored filtered data flow that has a smallest throughput.

13. The method of claim 12, further comprising:
calculating a second throughput for a second observation time window for each stored filtered data flow, wherein the second observation time window is longer than the observation time window; and
based on a determination that the second throughput of a stored filtered data flow is less than a second throughput threshold, removing the stored data flow from the traffic map.

14. The method of claim 9, further comprising:
receiving information from one or more sensors of the network connected device and filtering the stored filtered data flows including the information from the one or more sensors.

15. The method of claim 9, further comprising:
using a multi-layer machine learning model having a first layer and a second layer, wherein the first layer of the multi-layer machine learning model determines the service type and the second layer of the multi-layer machine learning model further divides the service type into sub-categories.

16. The method of claim 9, further comprising:
receiving current information from one or more sensors of the network connected device and determining the service type including the current information from the one or more sensors.

* * * * *